US012103321B2

(12) United States Patent
Murayama et al.

(10) Patent No.: US 12,103,321 B2
(45) Date of Patent: Oct. 1, 2024

(54) PRINTING APPARATUS AND CORRECTION METHOD THEREFOR

(71) Applicant: CANON KABUSHIKI KAISHA, Tokyo (JP)

(72) Inventors: Yoshiaki Murayama, Tokyo (JP); Shigeyasu Nagoshi, Yokohama (JP); Daisuke Ishii, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/100,407

(22) Filed: Jan. 23, 2023

(65) Prior Publication Data

US 2023/0226838 A1 Jul. 20, 2023

Related U.S. Application Data

(63) Continuation of application No. 17/185,081, filed on Feb. 25, 2021, now Pat. No. 11,590,784, which is a (Continued)

(30) Foreign Application Priority Data

Aug. 7, 2018 (JP) ................................ 2018-148713
Apr. 12, 2019 (JP) ................................ 2019-076490

(51) Int. Cl.
*B41J 29/393* (2006.01)

(52) U.S. Cl.
CPC ...... *B41J 29/393* (2013.01); *B41J 2029/3935* (2013.01)

(58) Field of Classification Search
CPC .............. B41J 29/393; B41J 2029/3935; B41J 2202/20; B41J 2/01; B41J 2002/012;
(Continued)

(56) References Cited

U.S. PATENT DOCUMENTS 6,554,387 B1 4/2003 Otsuki
6,793,319 B2 9/2004 Ikemoto et al.
(Continued)

FOREIGN PATENT DOCUMENTS

JP 2002-103597 A 4/2002
JP 2008-254203 A 10/2008
(Continued)

OTHER PUBLICATIONS

InnovationQ Plus Search, IP.com (search date Jul. 7, 2020).
Office Action dated Jun. 27, 2022, in Japanese Patent Application No. 2018-148713.

*Primary Examiner* — Lisa Solomon
(74) *Attorney, Agent, or Firm* — Venable LLP

(57) ABSTRACT

A printing apparatus includes a printhead having a plurality of chips each including a plurality of nozzle arrays which are arranged in a predetermined nozzle array direction and each of which is formed from a plurality of nozzles and energy generation elements provided in correspondence with the nozzles of each nozzle array and each configured to generate energy used for discharging ink. The apparatus relatively moves the printhead and a print medium in a direction intersecting the nozzle array direction, reads a predetermined test pattern printed on the print medium by driving the printhead, analyzes the read test pattern, calculates a slant of the printhead with respect to a reference based on a result of the analysis, and corrects the calculated slant of the printhead by moving the printhead.

7 Claims, 27 Drawing Sheets

Related U.S. Application Data continuation of application No. 16/530,598, filed on Aug. 2, 2019, now Pat. No. 10,960,695.

(58) Field of Classification Search
CPC .............. B41J 2025/008; B41J 2/16517; B41J 2/16588; B41J 2/2135
See application file for complete search history.

(56) References Cited

U.S. PATENT DOCUMENTS

| | | | |
|---|---|---|---|
| 8,636,332 B2 | 1/2014 | Salta | |
| 8,845,060 B2 | 9/2014 | Azuma et al. | |
| 9,028,049 B2 | 5/2015 | Azuma et al. | |
| 9,138,991 B2 | 9/2015 | Murase et al. | |
| 9,278,552 B2 | 3/2016 | Teshigawara et al. | |
| 9,340,009 B2 | 5/2016 | Murayama et al. | |
| 9,409,390 B1 * | 8/2016 | Nishikori | B41J 2/0458 |
| 10,293,620 B2 | 5/2019 | Murayama et al. | |
| 10,755,151 B2 | 8/2020 | Ishii et al. | |
| 2011/0249062 A1 | 10/2011 | Nakano et al. | |
| 2012/0033006 A1 | 2/2012 | Murayama et al. | |
| 2014/0111815 A1 | 4/2014 | Teshigawara et al. | |

FOREIGN PATENT DOCUMENTS

| | | |
|---|---|---|
| JP | 2010-125806 A | 6/2010 |
| JP | 2011-173324 A | 9/2011 |
| JP | 2012-035477 A | 2/2012 |
| JP | 2014-083748 A | 5/2014 |
| JP | 2015-163475 A | 9/2015 |
| JP | 2018-024144 A | 2/2018 |

* cited by examiner

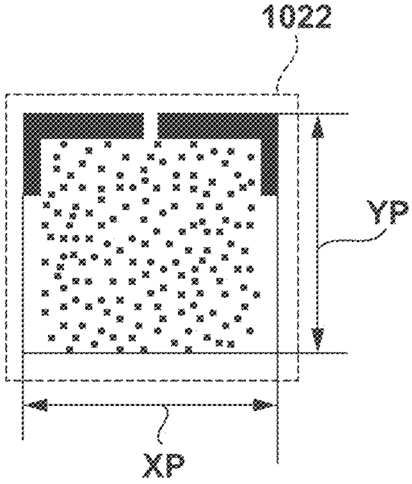
FIG. 15A
FIG. 15B
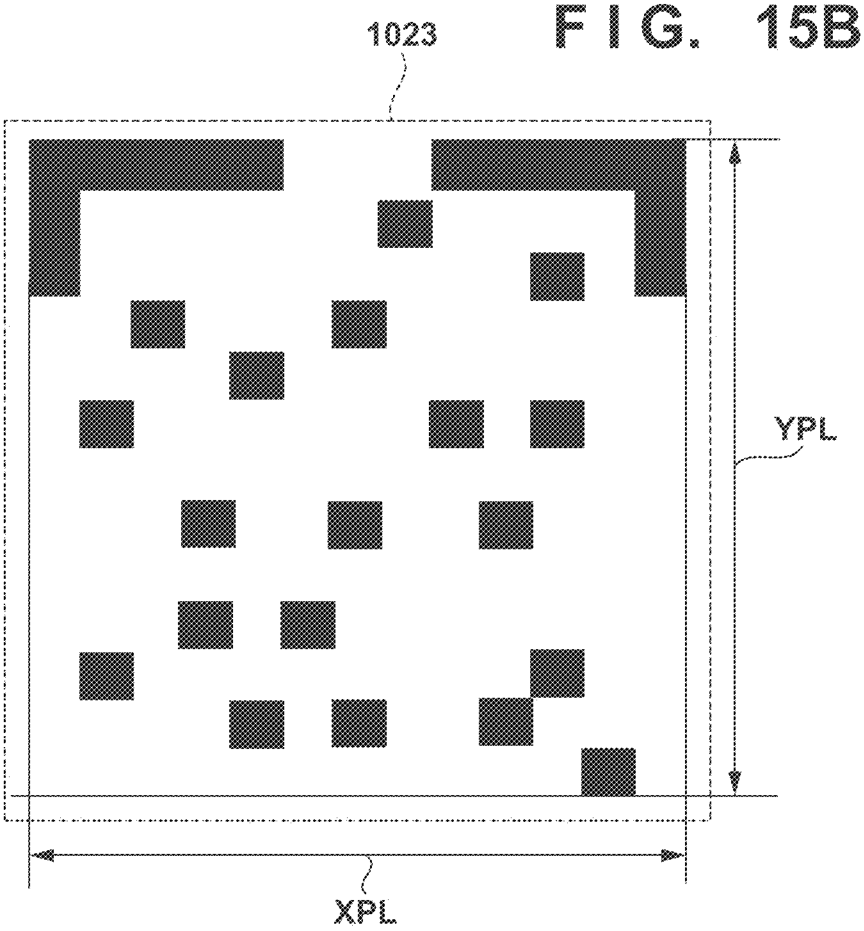

PRINTING APPARATUS AND CORRECTION METHOD THEREFOR

BACKGROUND OF THE INVENTION

Field of the Invention

The present invention relates to a printing apparatus and a correction method therefor and particularly to, for example, a printing apparatus for executing printing by transferring, to a print medium, an image formed by discharging ink from a printhead to a transfer member, and a correction method for the printing apparatus.

Description of the Related Art

Conventionally, there is known a printing apparatus provided with a full-line printhead having a print width corresponding to the width of a print medium. The full-line printhead achieves a long print width by connecting and arranging a plurality of head chips (head substrates) in a nozzle array direction. A printing apparatus including such full-line printhead can print an image on almost the entire surface of the print medium by relatively moving the printhead with respect to the print medium once.

In a full-line printhead according to an inkjet method, if an error occurs in the attachment position of the printhead or a relative attachment position between a plurality of head chips, the landing position (adherence position) of ink may shift due to the error. This shift causes deterioration in printing quality.

To cope with the shift of the landing position caused by the error of the attachment position, Japanese Patent Laid-Open No. 2012-035477 discloses a technique of reading a test pattern printed by a printhead using a CCD line sensor and correcting a landing position based on the reading result.

It is generally known that when discharging ink from a plurality of nozzles of the inkjet printhead, it is possible to stably discharge ink by time-divisionally driving the plurality of nozzles. However, if the plurality of nozzles are time-divisionally driven, a landing shift occurs due to a driving time difference between the nozzles. To cope with this, Japanese Patent Laid-Open No. 2018-024144 discloses a technique of reducing the influence of the landing shift.

When correcting an error of the attachment position of the printhead, especially when correcting an attachment slant with respect to the printing apparatus, correction is performed by shifting print data, as proposed in Japanese Patent Laid-Open No. 2012-035477.

However, when the influence of the landing shift caused by time-divisional driving described in Japanese Patent Laid-Open No. 2018-024144 is reduced, if a slant is corrected by shifting the print data, a step of one pixel is generated in a landing result, causing deterioration in image quality.

FIG. 10 is a view showing a slant of formed dots when printing is executed by time-divisionally driving a plurality of nozzles of a printhead. Referring to FIG. 10, the X direction is the conveyance direction of a print medium and the Y direction is a nozzle array direction.

In FIG. 10, reference numeral 10*a* shows a pattern printed by time-divisionally driving eight nozzles with a resolution of 1,200 dpi, and reference numeral 10*b* shows nozzles when the influence of a landing shift caused by time-divisional driving is reduced. Reference numeral 10*c* shows landing when executing time-divisional driving shown in reference numeral 10*a* using the eight nozzles shown in reference numeral 10*b*. Reference numeral 10*d* shows a case in which the nozzles shown in reference numeral 10*b* slant, and reference numeral 10*e* shows landing when executing time-divisional driving shown in reference numeral 10*a* using the nozzles shown in reference numeral 10*d*. Reference numeral 10*f* shows landing when executing slant correction for landing shifted by one column or more with respect to a resolution of 1,200 dpi.

In reference numeral 10*f* of FIG. 10, an arrow indicates a location where a landing shift of one pixel (one column) occurs. In this location, printing quality of a ruled line or a character deteriorates.

SUMMARY OF THE INVENTION

Accordingly, the present invention is conceived as a response to the above-described disadvantages of the conventional art.

For example, a printing apparatus and a correction method therefor according to this invention are capable of executing high-quality image printing.

According to one aspect of the present invention, there is provided a printing apparatus comprising: at least one printhead including a plurality of chips each including a plurality of nozzle arrays which are arranged in a predetermined nozzle array direction and each of which is formed from a plurality of nozzles and energy generation elements provided in correspondence with the nozzles of each nozzle array and each configured to generate energy to be used to discharge ink; a driving unit configured to sequentially drive print elements corresponding to nozzles of each of a plurality of groups into which the plurality of nozzles of each nozzle array included in the printhead are divided by setting nozzles successive in the nozzle array direction as one group; a moving unit configured to relatively move the printhead and a print medium in a direction intersecting the nozzle array direction; a reading unit configured to read a predetermined test pattern printed on the print medium by driving the printhead; an analysis unit configured to analyze the test pattern read by the reading unit; a calculation unit configured to calculate a slant of the printhead with respect to a reference based on a result of the analysis by the analysis unit; and a correction unit configured to correct the slant of the printhead calculated by the calculation unit by moving the printhead by the moving unit.

According to another aspect of the present invention, there is provided a correction method for a printing apparatus including at least one printhead having a plurality of chips each including a plurality of nozzle arrays which are arranged in a predetermined nozzle array direction and each of which is formed from a plurality of nozzles and energy generation elements provided in correspondence with the nozzles of each nozzle array and each configured to generate energy to be used to discharge ink, and a driving unit configured to sequentially drive print elements corresponding to nozzles of each of a plurality of groups into which the plurality of nozzles of each nozzle array included in the printhead are divided by setting nozzles successive in the nozzle array direction as one group, the method comprising: relatively moving the printhead and a print medium in a direction intersecting the nozzle array direction; reading a predetermined test pattern printed on the print medium by driving the printhead; analyzing the read test pattern; calculating a slant of the printhead with respect to a reference based on a result of the analysis; and correcting the calculated slant of the printhead by moving the printhead.

The invention is particularly advantageous since it is possible to achieve high-quality image printing by correcting a slant of a printhead.

Further features of the present invention will become apparent from the following description of exemplary embodiments (with reference to the attached drawings).

BRIEF DESCRIPTION OF THE DRAWINGS

FIGS. 15A and 15B are views respectively showing the detailed layouts of patterns 1022 and 1023 for pattern matching;

DESCRIPTION OF THE EMBODIMENTS

Exemplary embodiments of the present invention will now be described in detail in accordance with the accompanying drawings. Note that in each drawing, arrows X and Y indicate horizontal directions perpendicular to each other, and an arrow Z indicates an up/down direction.

Description of Terms

In this specification, the terms "print" and "printing" not only include the formation of significant information such as characters and graphics, but also broadly includes include the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium. Note that this invention is not limited to any specific ink component:, however, it is assumed that this embodiment uses water-based ink including water, resin, and pigment serving as coloring material.

Further, a "print element (or nozzle)" generically means an ink orifice or a liquid channel communicating with it, and an element for generating energy used to discharge ink, unless otherwise specified.

An element substrate for a printhead (head substrate) used below means not merely a base made of a silicon semiconductor, but an arrangement in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

<Printing System>

Figure 1:
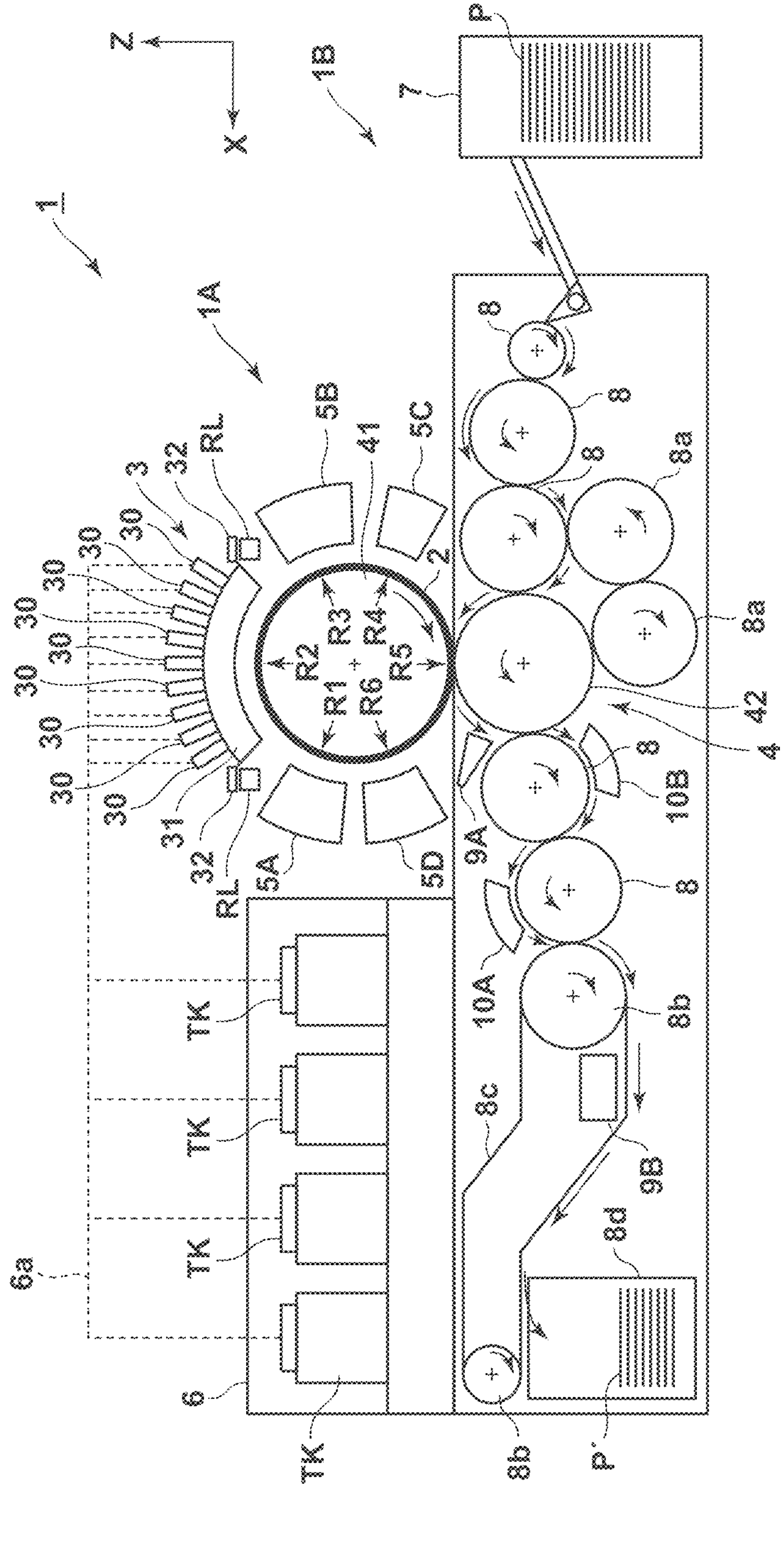
FIG. 1 is a schematic view showing a printing system according to an exemplary embodiment of the present invention.

FIG. 1 is a front view schematically showing a printing system 1 according to an embodiment of the present invention. The printing system 1 is a sheet inkjet printer that forms a printed product P' by transferring an ink image to a print medium P via a transfer member 2. The printing system 1 includes a printing apparatus 1A and a conveyance apparatus 1B. In this embodiment, an X direction, a Y direction, and a Z direction indicate the widthwise direction (total length direction), the depth direction, and the height direction of the printing system 1, respectively. The print medium P is conveyed in the X direction.

<Printing Apparatus>

The printing apparatus 1A includes a print unit 3, a transfer unit 4, peripheral units 5A to 5D, and a supply unit 6.

<Print Unit>

Figure 2:
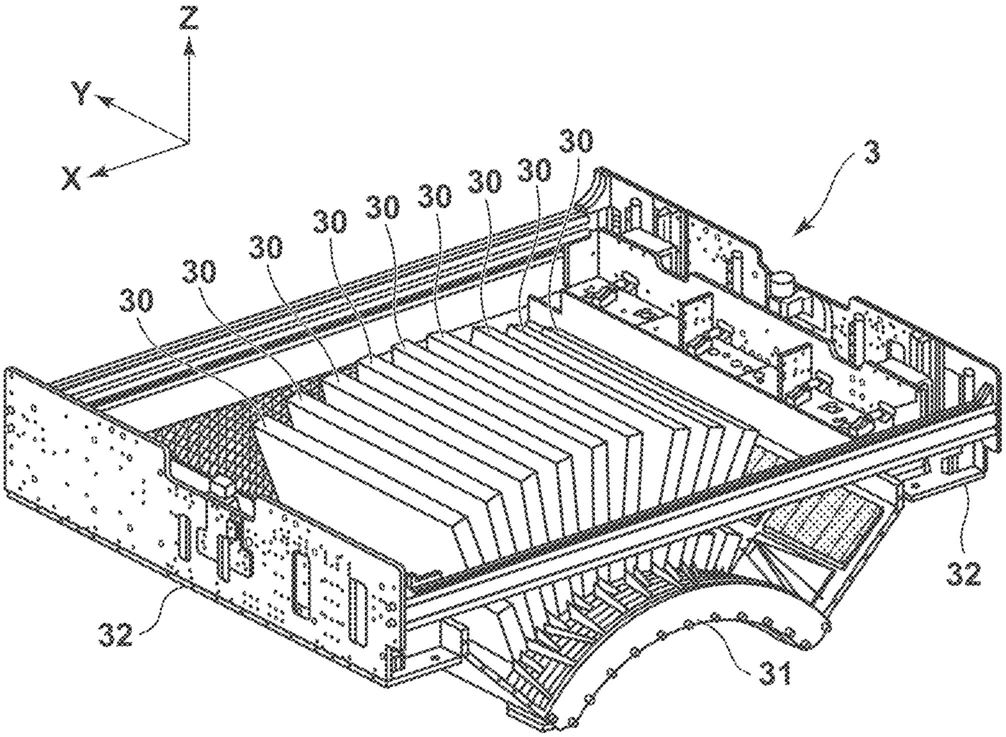
FIG. 2 is a perspective view showing a print unit.

The print unit 3 includes a plurality of printheads 30 and a carriage 31. A description will be made with reference to FIGS. 1 and 2. FIG. 2 is perspective view showing the print unit 3. The printheads 30 discharge liquid ink to the transfer member (intermediate transfer member) 2 and form ink images of a printed image on the transfer member 2.

In this embodiment, each printhead 30 is a full-line head elongated in the Y direction, and nozzles are arrayed in a range where they cover the width of an image printing area of a print medium having a usable maximum size. Each printhead 30 has an ink discharge surface with the opened nozzle on its lower surface, and the ink discharge surface faces the surface of the transfer member 2 via a minute gap (for example, several mm). In this embodiment, the transfer member 2 is configured to move on a circular orbit cyclically, and thus the plurality of printheads 30 are arranged radially.

Each nozzle includes a discharge element. The discharge element is, for example, an element that generates a pressure in the nozzle and discharges ink in the nozzle, and the technique of an inkjet head in a well-known inkjet printer is applicable. For example, an element that discharges ink by causing film boiling in ink with an electrothermal transducer and forming a bubble, an element that discharges ink by an electromechanical transducer (piezoelectric element), an element that discharges ink by using static electricity, or the like can be given as the discharge element. A discharge element that uses the electrothermal transducer can be used from the viewpoint of high-speed and high-density printing.

In this embodiment, nine printheads 30 are provided. The respective printheads 30 discharge different kinds of inks. The different kinds of inks are, for example, different in coloring material and include yellow ink, magenta ink, cyan ink, black ink, and the like. One printhead 30 discharges one kind of ink. However, one printhead 30 may be configured to discharge the plurality of kinds of inks. When the plurality of printheads 30 are thus provided, some of them may discharge ink (for example, clear ink or transfer acceleration liquid (hereinafter referred to as "transfer accelerator")) that does not include a coloring material. Transfer of an image formed on the transfer member 2 to a print medium is accelerated by discharging a transfer accelerator to the transfer member 2 after color ink has been discharged, thus largely reducing an amount of ink remaining on the transfer member 2 after the transfer.

The carriage 31 supports the plurality of printheads 30. The end of each printhead 30 on the side of an ink discharge surface is fixed to the carriage 31. This makes it possible to maintain a gap on the surface between the ink discharge surface and the transfer member 2 more precisely. The carriage 31 is configured to be displaceable while mounting the printheads 30 by the guide of each guide member RL. In this embodiment, the guide members RL are rail members elongated in the Y direction and provided as a pair separately in the X direction. A slide portion 32 is provided on each side of the carriage 31 in the X direction. The slide portions 32 engage with the guide members RL and slide along the guide members RL in the Y direction.

Figure 3:
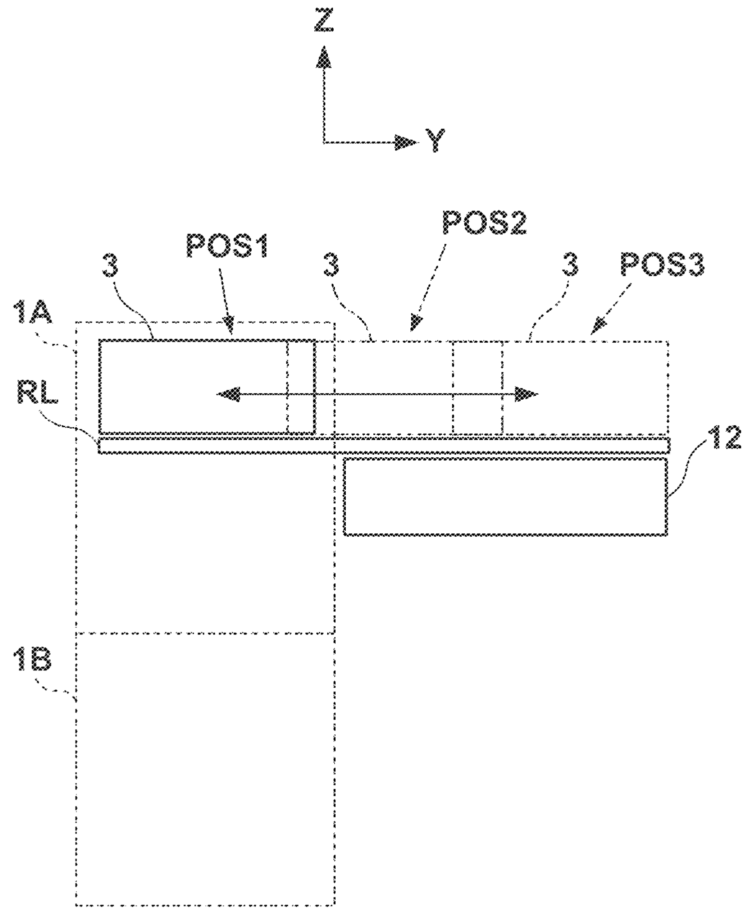
FIG. 3 is an explanatory view showing a displacement mode of the print unit in FIG. 2.

FIG. 3 is a view showing a displacement mode of the print unit 3 and schematically shows the right side surface of the printing system 1. A recovery unit 12 is provided in the rear of the printing system 1. The recovery unit 12 has a mechanism for recovering discharge performance of the printheads 30. For example, a cap mechanism which caps the ink discharge surface of each printhead 30, a wiper mechanism which wipes the ink discharge surface, a suction mechanism which sucks ink in the printhead 30 by a negative pressure from the ink discharge surface can be given as such mechanisms.

The guide member RL is elongated over the recovery unit 12 from the side of the transfer member 2. By the guide of the guide member RL, the print unit 3 is displaceable between a discharge position POS1 at which the print unit 3 is indicated by a solid line and a recovery position POS3 at which the print unit 3 is indicated by a broken line, and is moved by a driving mechanism (not shown).

The discharge position POS1 is a position at which the print unit 3 discharges ink to the transfer member 2 and a position at which the ink discharge surface of each printhead 30 faces the surface of the transfer member 2. The recovery position POS3 is a position retracted from the discharge position POS1 and a position at which the print unit 3 is positioned above the recovery unit 12. The recovery unit 12 can perform recovery processing on the printheads 30 when the print unit 3 is positioned at the recovery position POS3. In this embodiment, the recovery unit 12 can also perform the recovery processing in the middle of movement before the print unit 3 reaches the recovery position POS3. There is a preliminary recovery position POS2 between the discharge position POS1 and the recovery position POS3. The recovery unit 12 can perform preliminary recovery processing on the printheads 30 at the preliminary recovery position POS2 while the printheads 30 move from the discharge position POS1 to the recovery position POS3.

Figure 11:
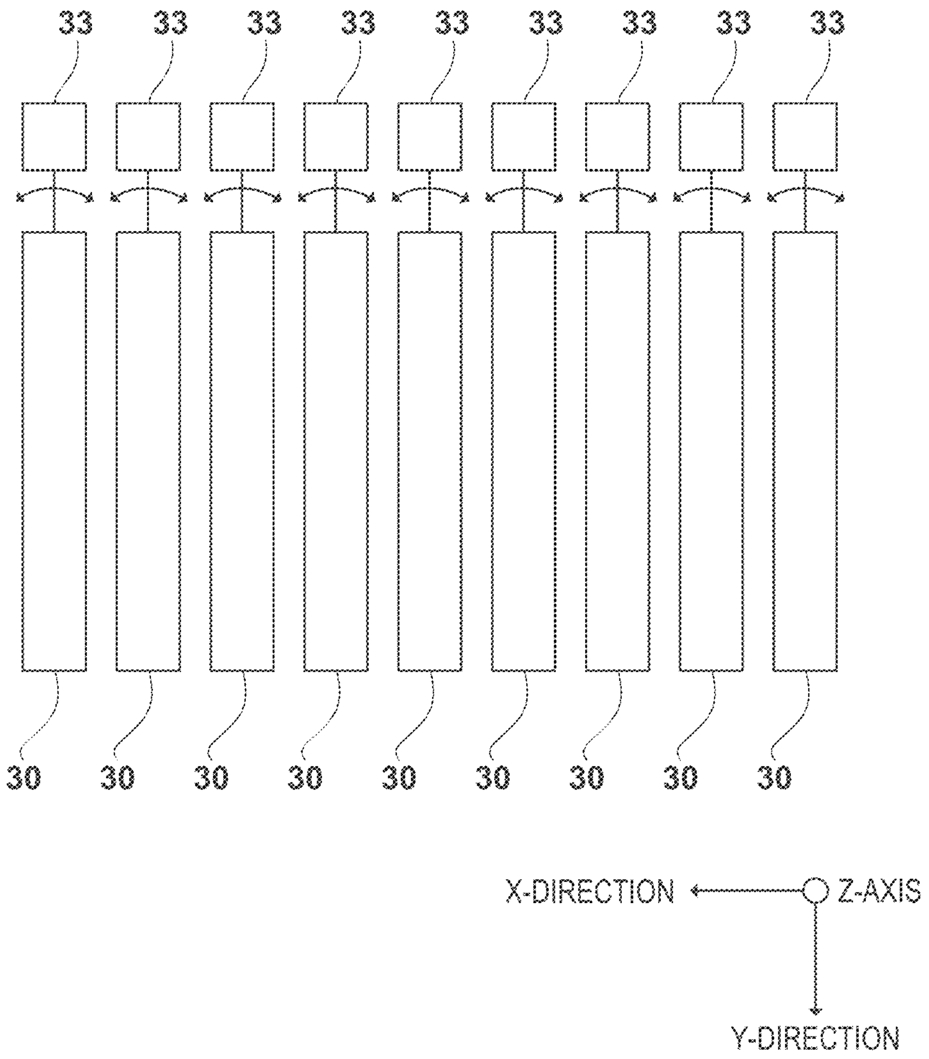
FIG. 11 is a view showing a state in which printheads mounted on a carriage are attached.

FIG. 11 is a view showing a state in which the printheads 30 mounted on the carriage 31 are attached.

Each of the nine printheads 30 is attached with an actuator 33 for correcting the slant of the printhead around the Z-axis perpendicular to the X and Y directions. A sliding unit and a cam mechanism (neither of which is shown) are provided between the actuator 33 and the printhead 30, and it is possible to adjust the slant of the printhead around the Z-axis by operating the actuator 33.

<Transfer Unit>

The transfer unit 4 will be described with reference to FIG. 1. The transfer unit 4 includes a transfer drum 41 and a pressurizing drum 42. Each of these drums is a rotating body that rotates about a rotation axis in the Y direction and has a columnar outer peripheral surface. In FIG. 1, arrows shown in respective views of the transfer drum 41 and the pressurizing drum 42 indicate their rotation directions. The transfer drum 41 rotates clockwise, and the pressurizing drum 42 rotates anticlockwise.

The transfer drum 41 is a support member that supports the transfer member 2 on its outer peripheral surface. The transfer member 2 is provided on the outer peripheral surface of the transfer drum 41 continuously or intermittently in a circumferential direction. If the transfer member 2 is provided continuously, it is formed into an endless swath. If the transfer member 2 is provided intermittently, it is formed into swaths with ends dividedly into a plurality of segments. The respective segments can be arranged in an arc at an equal pitch on the outer peripheral surface of the transfer drum 41.

The transfer member 2 moves cyclically on the circular orbit by rotating the transfer drum 41. By the rotational phase of the transfer drum 41, the position of the transfer member 2 can be discriminated into a processing area R1 before discharge, a discharge area R2, processing areas R3 and R4 after discharge, a transfer area R5, and a processing area R6 after transfer. The transfer member 2 passes through these areas cyclically.

The processing area R1 before discharge is an area where preprocessing is performed on the transfer member 2 before the print unit 3 discharges ink and an area where the peripheral unit 5A performs processing. In this embodiment, a reactive liquid is applied. The discharge area R2 is a formation area where the print unit 3 forms an ink image by discharging ink to the transfer member 2. The processing areas R3 and R4 after discharge are processing areas where processing is performed on the ink image after ink discharge. The processing area R3 after discharge is an area where the peripheral unit 5B performs processing, and the processing area R4 after discharge is an area where the peripheral unit 5C performs processing. The transfer area R5 is an area where the transfer unit 4 transfers the ink image on the transfer member 2 to the print medium P. The processing area R6 after transfer is an area where post processing is performed on the transfer member 2 after transfer and an area where the peripheral unit 5D performs processing.

In this embodiment, the discharge area R2 is an area with a predetermined section. The other areas R1 and R3 to R6 have narrower sections than the discharge area R2. Comparing to the face of a clock, in this embodiment, the processing area R1 before discharge is positioned at almost 10 o'clock, the discharge area R2 is in a range from almost 11 o'clock to 1 o'clock, the processing area R3 after discharge is positioned at almost 2 o'clock, and the processing area R4 after discharge is positioned at almost 4 o'clock. The transfer area R5 is positioned at almost 6 o'clock, and the processing area R6 after transfer is an area at almost 8 o'clock.

The transfer member 2 may be formed by a single layer but may be an accumulative body of a plurality of layers. If the transfer member 2 is formed by the plurality of layers, it may include three layers of, for example, a surface layer, an elastic layer, and a compressed layer. The surface layer is an outermost layer having an image formation surface where the ink image is formed. By providing the compressed layer, the compressed layer absorbs deformation and disperses a local pressure fluctuation, making it possible to maintain transferability even at the time of high-speed printing. The elastic layer is a layer between the surface layer and the compressed layer.

As a material for the surface layer, various materials such as a resin and a ceramic can be used appropriately. With respect to durability or the like, however, a material high in compressive modulus can be used. More specifically, an acrylic resin, an acrylic silicone resin, a fluoride-containing resin, a condensate obtained by condensing a hydrolyzable organosilicon compound, and the like can be given. The surface layer that has undergone a surface treatment may be used in order to improve wettability of the reactive liquid, the transferability of an image, or the like. Frame processing, a corona treatment, a plasma treatment, a polishing treatment, a roughing treatment, an active energy beam irradiation treatment, an ozone treatment, a surfactant treatment, a silane coupling treatment, or the like can be given as the surface treatment. A plurality of them may be combined. It is also possible to provide any desired surface shape in the surface layer.

For example, acrylonitrile-butadiene rubber, acrylic rubber, chloroprene rubber, urethane rubber, silicone rubber, or the like can be given as a material for the compressed layer. When such a rubber material is formed, a porous rubber material may be formed by blending a predetermined amount of a vulcanizing agent, vulcanizing accelerator, or the like and further blending a foaming agent, or a filling agent such as hollow fine particles or salt as needed. Consequently, a bubble portion is compressed along with a volume change with respect to various pressure fluctuations, and thus deformation in directions other than a compression direction is small, making it possible to obtain more stable transferability and durability. As the porous rubber material, there are a material having an open cell structure in which respective pores continue to each other and a material having a closed cell structure in which the respective pores are independent of each other. However, either structure may be used, or both of these structures may be used.

As a member for the elastic layer, the various materials such as the resin and the ceramic can be used appropriately. With respect to processing characteristics, various materials of an elastomer material and a rubber material can be used. More specifically, for example, fluorosilicone rubber, phenyl silicone rubber, fluorine rubber, chloroprene rubber, urethane rubber, nitrile rubber, and the like can be given. In addition, ethylene propylene rubber, natural rubber, styrene rubber, isoprene rubber, butadiene rubber, the copolymer of ethylene/propylene/butadiene, nitrile-butadiene rubber, and the like can be given. In particular, silicone rubber, fluorosilicone rubber, and phenyl silicon rubber are advantageous in terms of dimensional stability and durability because of their small compression set. They are also advantageous in terms of transferability because of their small elasticity change by a temperature.

Between the surface layer and the elastic layer and between the elastic layer and the compressed layer, various adhesives or double-sided adhesive tapes can also be used in order to fix them to each other. The transfer member 2 may also include a reinforce layer high in compressive modulus in order to suppress elongation in a horizontal direction or maintain resilience when attached to the transfer drum 41. Woven fabric may be used as a reinforce layer. The transfer member 2 can be manufactured by combining the respective layers formed by the materials described above in any desired manner.

The outer peripheral surface of the pressurizing drum 42 is pressed against the transfer member 2. At least one grip mechanism which grips the leading edge portion of the print medium P is provided on the outer peripheral surface of the pressurizing drum 42. A plurality of grip mechanisms may be provided separately in the circumferential direction of the pressurizing drum 42. The ink image on the transfer member 2 is transferred to the print medium P when it passes through a nip portion between the pressurizing drum 42 and the transfer member 2 while being conveyed in tight contact with the outer peripheral surface of the pressurizing drum 42.

The transfer drum 41 and the pressurizing drum 42 share a driving source such as a motor that drives them. A driving force can be delivered by a transmission mechanism such as a gear mechanism.

<Peripheral Unit>

The peripheral units 5A to 5D are arranged around the transfer drum 41. In this embodiment, the peripheral units 5A to 5D are specifically an application unit, an absorption unit, a heating unit, and a cleaning unit in order.

The application unit 5A is a mechanism which applies the reactive liquid onto the transfer member 2 before the print unit 3 discharges ink. The reactive liquid is a liquid that contains a component increasing an ink viscosity. An increase in ink viscosity here means that a coloring material, a resin, and the like that form the ink react chemically or suck physically by contacting the component that increases the ink viscosity, recognizing the increase in ink viscosity. This increase in ink viscosity includes not only a case in which an increase in viscosity of entire ink is recognized but also a case in which a local increase in viscosity is generated by coagulating some of components such as the coloring material and the resin that form the ink.

The component that increases the ink viscosity can use, without particular limitation, a substance such as metal ions or a polymeric coagulant that causes a pH change in ink and coagulates the coloring material in the ink, and can use an organic acid. For example, a roller, a printhead, a die coating apparatus (die coater), a blade coating apparatus (blade coater), or the like can be given as a mechanism which applies the reactive liquid. If the reactive liquid is applied to the transfer member 2 before the ink is discharged to the transfer member 2, it is possible to immediately fix ink that reaches the transfer member 2. This makes it possible to suppress bleeding caused by mixing adjacent inks.

The absorption unit 5B is a mechanism which absorbs a liquid component from the ink image on the transfer member 2 before transfer. It is possible to suppress, for example, a blur of an image printed on the print medium P by decreasing the liquid component of the ink image. Describing a decrease in liquid component from another point of view, it is also possible to represent it as condensing ink that forms the ink image on the transfer member 2. Condensing the ink means increasing the content of a solid content such as a coloring material or a resin included in the ink with respect to the liquid component by decreasing the liquid component included in the ink.

The absorption unit 5B includes, for example, a liquid absorbing member that decreases the amount of the liquid component of the ink image by contacting the ink image. The liquid absorbing member may be formed on the outer peripheral surface of the roller or may be formed into an endless sheet-like shape and run cyclically. In terms of protection of the ink image, the liquid absorbing member may be moved in synchronism with the transfer member 2 by making the moving speed of the liquid absorbing member equal to the peripheral speed of the transfer member 2.

The liquid absorbing member may include a porous body that contacts the ink image. The pore size of the porous body on the surface that contacts the ink image may be equal to or smaller than 10 μm in order to suppress adherence of an ink solid content to the liquid absorbing member. The pore size here refers to an average diameter and can be measured by a known means such as a mercury intrusion technique, a nitrogen adsorption method, an SEM image observation, or the like. Note that the liquid component does not have a fixed shape, and is not particularly limited if it has fluidity and an almost constant volume. For example, water, an organic solvent, or the like contained in the ink or reactive liquid can be given as the liquid component.

The heating unit 5C is a mechanism which heats the ink image on the transfer member 2 before transfer. A resin in the ink image melts by heating the ink image, improving transferability to the print medium P. A heating temperature can be equal to or higher than the minimum film forming temperature (MFT) of the resin. The MFT can be measured by each apparatus that complies with a generally known method such as JIS K 6828-2: 2003 or ISO 2115: 1996. From the viewpoint of transferability and image robustness, the ink image may be heated at a temperature higher than the MFT by 10° C. or higher, or may further be heated at a temperature higher than the MFT by 20° C. or higher. The heating unit 5C can use a known heating device, for example, various lamps such as infrared rays, a warm air fan, or the like. An infrared heater can be used in terms of heating efficiency.

The cleaning unit 5D is a mechanism which cleans the transfer member 2 after transfer. The cleaning unit 5D removes ink remaining on the transfer member 2, dust on the transfer member 2, or the like. The cleaning unit 5D can use a known method, for example, a method of bringing a porous member into contact with the transfer member 2, a method of scraping the surface of the transfer member 2 with a brush, a method of scratching the surface of the transfer member 2 with a blade, or the like as needed. A known shape such as a roller shape or a web shape can be used for a cleaning member used for cleaning.

As described above, in this embodiment, the application unit 5A, the absorption unit 5B, the heating unit 5C, and the cleaning unit 5D are included as the peripheral units. However, cooling functions of the transfer member 2 may be applied, or cooling units may be added to these units. In this embodiment, the temperature of the transfer member 2 may be increased by heat of the heating unit 5C. If the ink image exceeds the boiling point of water as a prime solvent of ink after the print unit 3 discharges ink to the transfer member 2, performance of liquid component absorption by the absorption unit 5B may be degraded. It is possible to maintain the performance of liquid component absorption by cooling the transfer member 2 such that the temperature of the discharged ink is maintained below the boiling point of water.

The cooling unit may be an air blowing mechanism which blows air to the transfer member 2, or a mechanism which brings a member (for example, a roller) into contact with the transfer member 2 and cools this member by air-cooling or water-cooling. The cooling unit may be a mechanism which cools the cleaning member of the cleaning unit 5D. A cooling timing may be a period before application of the reactive liquid after transfer.

<Supply Unit>

The supply unit 6 is a mechanism which supplies ink to each printhead 30 of the print unit 3. The supply unit 6 may be provided on the rear side of the printing system 1. The supply unit 6 includes a reservoir TK that reserves ink for each kind of ink. Each reservoir TK may be made of a main tank and a sub tank. Each reservoir TK and a corresponding one of the printheads 30 communicate with each other by a liquid passageway 6*a*, and ink is supplied from the reservoir TK to the printhead 30. The liquid passageway 6*a* may circulate ink between the reservoirs TK and the printheads 30. The supply unit 6 may include, for example, a pump that circulates ink. A deaerating mechanism which deaerates bubbles in ink may be provided in the middle of the liquid passageway 6*a* or in each reservoir TK. A valve that adjusts the fluid pressure of ink and an atmospheric pressure may be provided in the middle of the liquid passageway 6*a* or in each reservoir TK. The heights of each reservoir TK and each printhead 30 in the Z direction may be designed such that the liquid surface of ink in the reservoir TK is positioned lower than the ink discharge surface of the printhead 30.

<Conveyance Apparatus>

The conveyance apparatus 1B is an apparatus that feeds the print medium P to the transfer unit 4 and discharges, from the transfer unit 4, the printed product V to which the ink image was transferred. The conveyance apparatus 1B includes a feeding unit 7, a plurality of conveyance drums 8 and 8*a*, two sprockets 8*b*, a chain 8*c*, and a collection unit 8*d*. In FIG. 1, an arrow inside a view of each constituent element in the conveyance apparatus 1B indicates a rotation direction of the constituent element, and an arrow outside the view of each constituent element indicates a conveyance path of the print medium P or the printed product V. The print medium P is conveyed from the feeding unit 7 to the transfer unit 4, and the printed product P' is conveyed from the transfer unit 4 to the collection unit 8*d*. The side of the feeding unit 7 may be referred to as an upstream side in a conveyance direction, and the side of the collection unit 8*d* may be referred to as a downstream side.

The feeding unit 7 includes a stacking unit where the plurality of print media P are stacked and a feeding mechanism which feeds the print media P one by one from the stacking unit to the most upstream conveyance drum 8. Each of the conveyance drums 8 and 8*a* is a rotating body that rotates about the rotation axis in the Y direction and has a columnar outer peripheral surface. At least one grip mechanism which grips the leading edge portion of the print medium P (printed product P') is provided on the outer peripheral surface of each of the conveyance drums 8 and 8*a*. A gripping operation and release operation of each grip mechanism may be controlled such that the print medium P is transferred between the adjacent conveyance drums.

The two conveyance drums 8*a* are used to reverse the print medium P. When the print medium P undergoes double-side printing, it is not transferred to the conveyance drum 8 adjacent on the downstream side but transferred to the conveyance drums 8*a* from the pressurizing drum 42 after transfer onto the surface. The print medium P is reversed via the two conveyance drums 8*a* and transferred to the pressurizing drum 42 again via the conveyance drums 8 on the upstream side of the pressurizing drum 42. Consequently, the reverse surface of the print medium P faces the transfer drum 41, transferring the ink image to the reverse surface.

The chain 8*c* is wound between the two sprockets 8*b*. One of the two sprockets 8*b* is a driving sprocket, and the other is a driven sprocket. The chain 8*c* runs cyclically by rotating the driving sprocket. The chain 8*c* includes a plurality of grip mechanisms spaced apart from each other in its longitudinal direction. Each grip mechanism grips the end of the printed product P'. The printed product P' is transferred from the conveyance drum 8 positioned at a downstream end to each grip mechanism of the chain 8*c*, and the printed product P' gripped by the grip mechanism is conveyed to the collection unit 8*d* by running the chain 8*c*, releasing gripping. Consequently, the printed product P' is stacked in the collection unit 8*d*.

<Post Processing Unit>

The conveyance apparatus 1B includes post processing units 10A and 10B. The post processing units 10A and 10B are mechanisms which are arranged on the downstream side of the transfer unit 4, and perform post processing on the printed product P'. The post processing unit 10A performs processing on the obverse surface of the printed product P', and the post processing unit 10B performs processing on the reverse surface of the printed product P'. The contents of the post processing includes, for example, coating that aims at protection, glossy, and the like of an image on the image printed surface of the printed product P'. For example, liquid application, sheet welding, lamination, and the like can be given as an example of coating.

<Inspection Unit>

The conveyance apparatus 1B includes inspection units 9A and 9B. The inspection units 9A and 9B are mechanisms which are arranged on the downstream side of the transfer unit 4, and inspect the printed product P'.

In this embodiment, the inspection unit 9A is an image capturing apparatus that captures an image printed on the printed product V and includes an image sensor, for example, a CCD sensor, a CMOS sensor, or the like. The inspection unit 9A captures a printed image while a printing operation is performed continuously. Based on the image captured by the inspection unit 9A, it is possible to confirm a temporal change in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. The inspection unit 9A may inspect all printed images or may inspect the images every predetermined sheets.

In this embodiment, the inspection unit 9B is also an image capturing apparatus that captures an image printed on the printed product V and includes an image sensor, for example, a CCD sensor, a CMOS sensor, or the like. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged at a position to capture the printed product P' conveyed by the chain 8*c*. When the inspection unit 9B captures the printed image, it captures the entire image by temporarily suspending the run of the chain 8*c*. The inspection unit 9B may be a scanner that scans the printed product P'.

Figure 8:
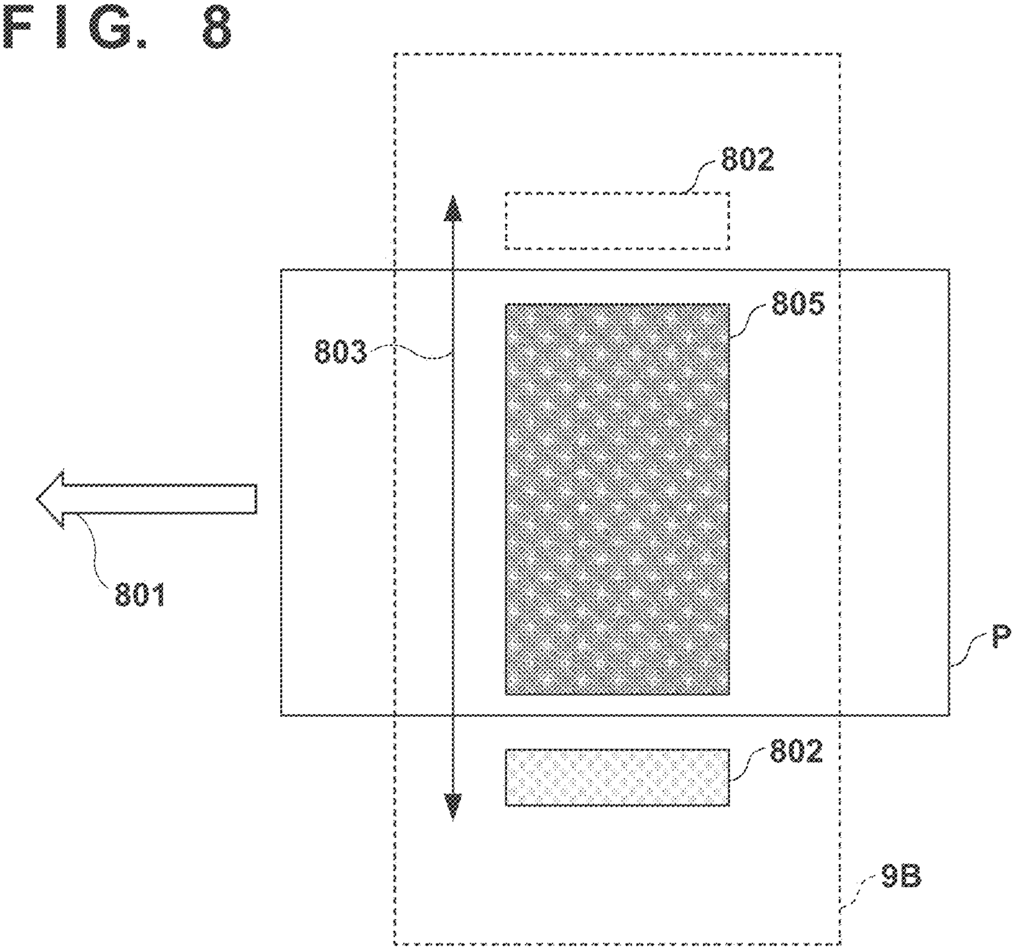
FIG. 8 is a view showing the arrangement of an inspection unit 9B and its peripheral portion when viewed from above a printing apparatus.
Figure 9:
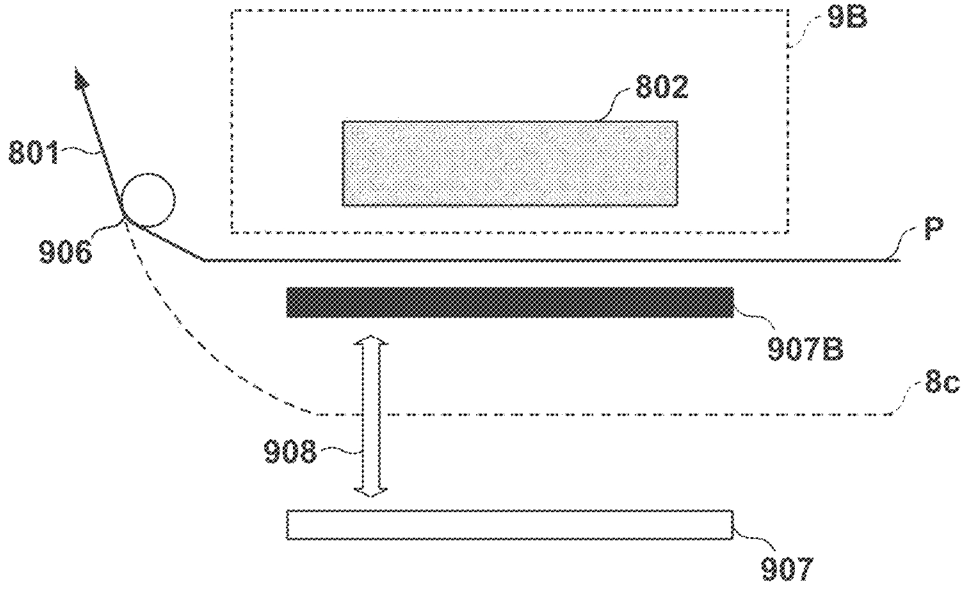
FIG. 9 is a view showing the arrangement of the inspection unit 9B and its peripheral portion when viewed from the front side of the printing apparatus.
Figure 10:
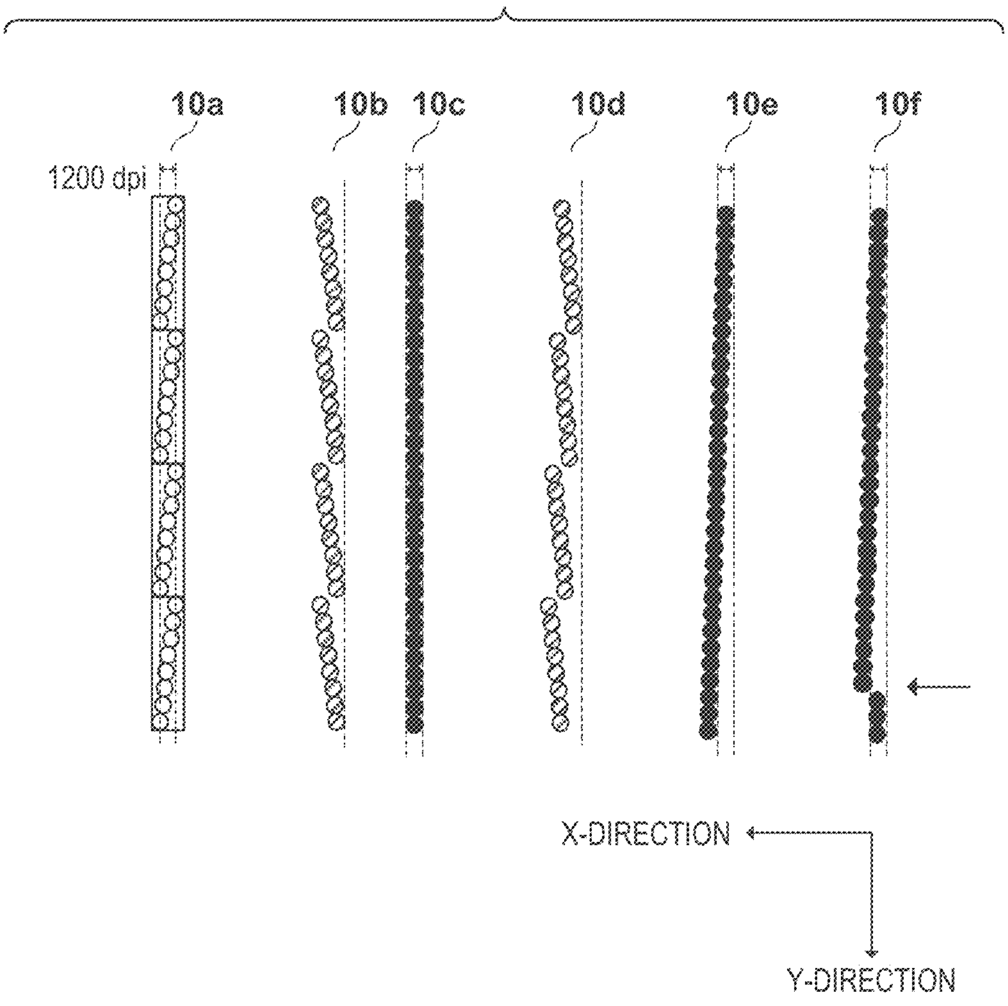
FIG. 10 is a view showing a slant of formed dots when printing is executed by time-divisionally driving a plurality of nozzles of a printhead.

FIG. 8 is a view showing the arrangement of the inspection unit 9B and its peripheral portion when viewed from above the printing apparatus. FIG. 9 is a view showing the arrangement of the inspection unit 9B and its peripheral portion when viewed from the front side of the printing apparatus.

Referring to FIGS. 8 and 9, the print medium P is conveyed in a conveyance direction 801 to stop near the inspection unit 9B, and an image is captured using a CCD sensor unit 802 capable of scanning in a direction 803 perpendicular to the conveyance direction. The leading end of the print medium P is nipped by a grip mechanism 906 arranged in the chain 8*c*, and the chain 8*c* runs cyclically, thereby conveying the print medium P to the inspection unit 9B. When capturing an area 805 of the print medium P, an elevating base 907 that can be driven in a vertical direction 908 is moved to a pressing position 907B to move the print medium P closer to the CCD sensor unit 802, thereby capturing an image of the area 805.

<Control Unit>

Figure 4:
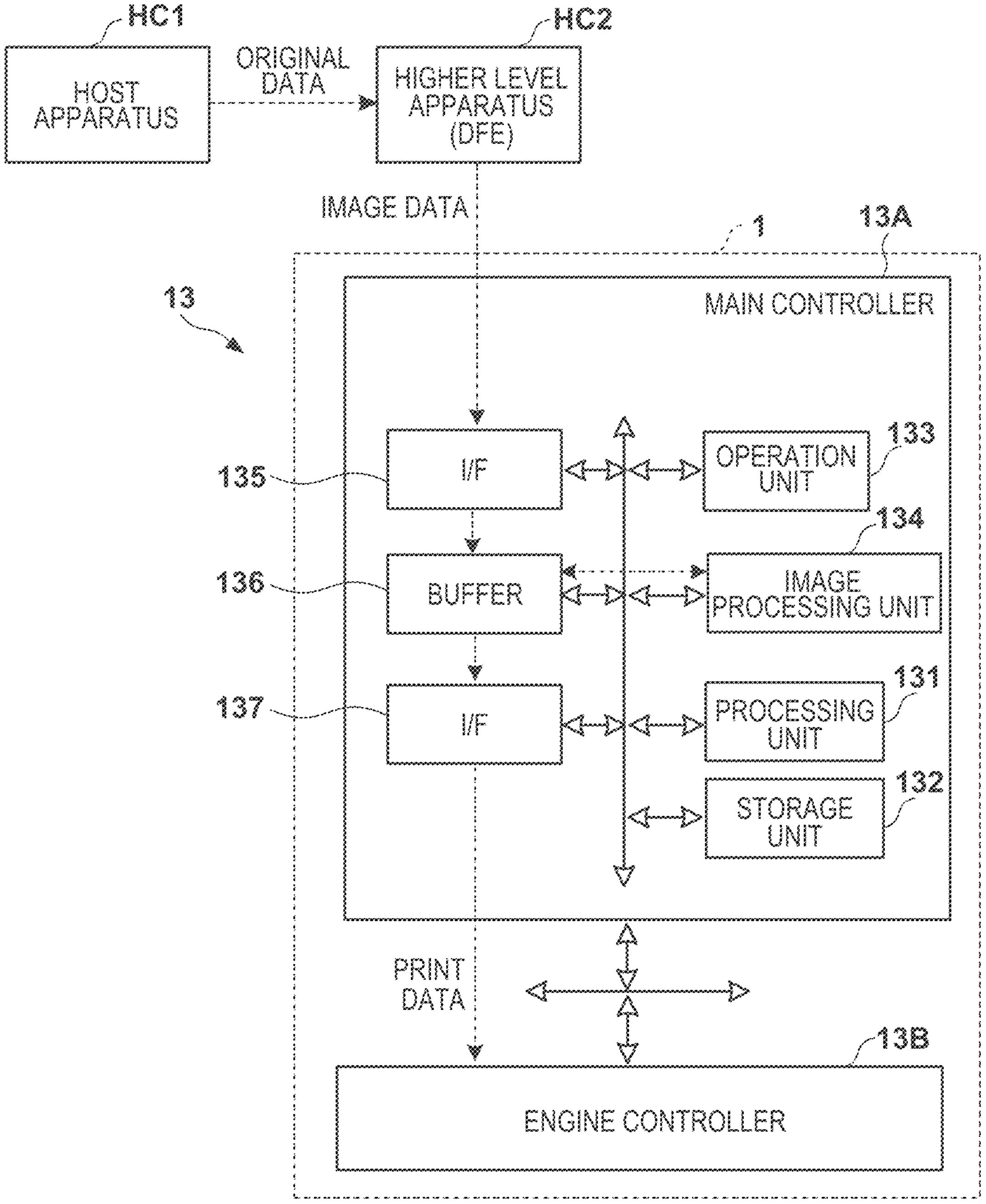
FIG. 4 is a block diagram showing a control system of the printing system in FIG. 1.
Figure 5:
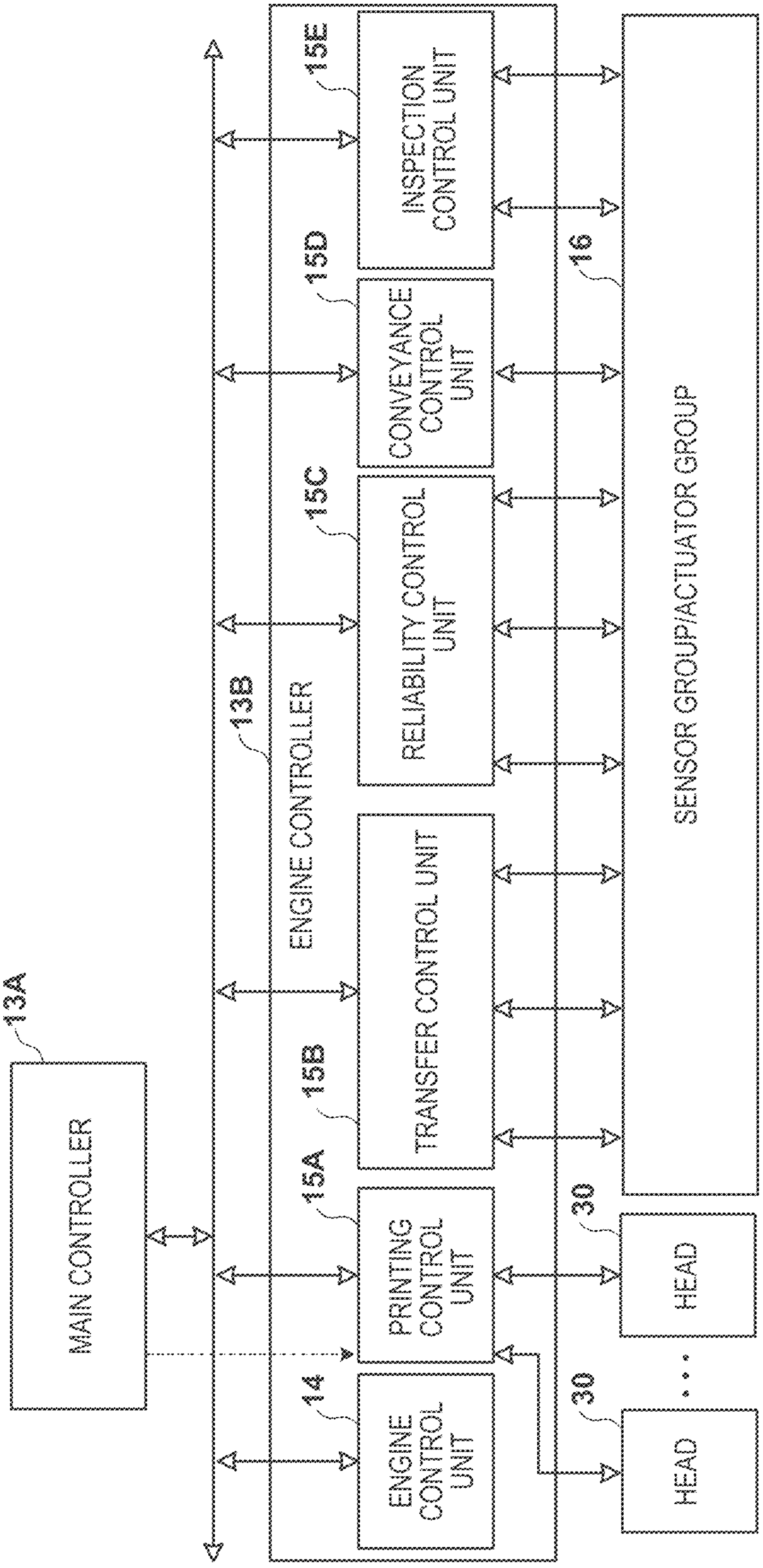
FIG. 5 is a block diagram showing the control system of the printing system in FIG. 1.

A control unit of the printing system 1 will be described next. FIGS. 4 and 5 are block diagrams each showing a control unit 13 of the printing system 1. The control unit 13 is communicably connected to a higher level apparatus (DFE) HC2, and the higher level apparatus HC2 is communicably connected to a host apparatus HC1.

The host apparatus HC1 may be, for example, a PC (Personal Computer) serving as an information processing apparatus, or a server apparatus. A communication method between the host apparatus HC1 and the higher level apparatus HC2 may be, without particular limitation, either wired or wireless communication.

Original data to be the source of a printed image is generated or saved in the host apparatus HC1. The original data here is generated in the format of, for example, an electronic file such as a document file or an image file. This original data is transmitted to the higher level apparatus HC2. In the higher level apparatus HC2, the received original data is converted into a data format (for example, RGB data that represents an image by RGB) available by the control unit 13. The converted data is transmitted from the higher level apparatus HC2 to the control unit 13 as image data. The control unit 13 starts a printing operation based on the received image data.

In this embodiment, the control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, executes programs stored in the storage unit 132, and controls the entire main controller 13A. The storage unit 132 is a storage device such as a RAM, a ROM, a hard disk, or an SSD, stores data and the programs executed by the processing unit (CPU) 131, and provides the processing unit (CPU) 131 with a work area. An external storage unit may further be provided in addition to the storage unit 132. The operation unit 133 is, for example, an input device such as a touch panel, a keyboard, or a mouse and accepts a user instruction. The operation unit 133 may be formed by an input unit and a display unit integrated with each other. Note that a user operation is not limited to an input via the operation unit 133, and an arrangement may be possible in which, for example, an instruction is accepted from the host apparatus HC1 or the higher level apparatus HC2.

The image processing unit 134 is, for example, an electronic circuit including an image processing processor. The buffer 136 is, for example, a RAM, a hard disk, or an SSD. The communication I/F 135 communicates with the higher level apparatus HC2, and the communication I/F 137 communicates with the engine controller 13B. In FIG. 4, broken-line arrows exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted from the communication I/F 137 to the engine controller 13B as print data used by a print engine.

As shown in FIG. 5, the engine controller 13B includes an engine control units 14 and 15A to 15E, and obtains a detection result of a sensor group/actuator group 16 of the printing system 1 and controls driving of the groups. Each of these control units includes a processor such as a CPU, a storage device such as a RAM or a ROM, and an interface with an external device. Note that the division of the control units is merely illustrative, and a plurality of subdivided control units may perform some of control operations or conversely, the plurality of control units may be integrated with each other, and one control unit may be configured to implement their control contents.

The engine control unit 14 controls the entire engine controller 13B. The printing control unit 15A converts print data received from the main controller 13A into raster data or the like in a data format suitable for driving of the printheads 30. The printing control unit 15A controls discharge of each printhead 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism which moves the print unit 3 between the discharge position POS1 and the recovery position POS3.

The conveyance control unit 15D controls driving of the transfer unit 4 and controls the conveyance apparatus 1B. The inspection control unit 15E controls the inspection unit 9B and the inspection unit 9A.

Of the sensor group/actuator group 16, the sensor group includes a sensor that detects the position and speed of a movable part, a sensor that detects a temperature, an image sensor, and the like. The actuator group includes a motor, an electromagnetic solenoid, an electromagnetic valve, and the like.

Operation Example

Figure 6:
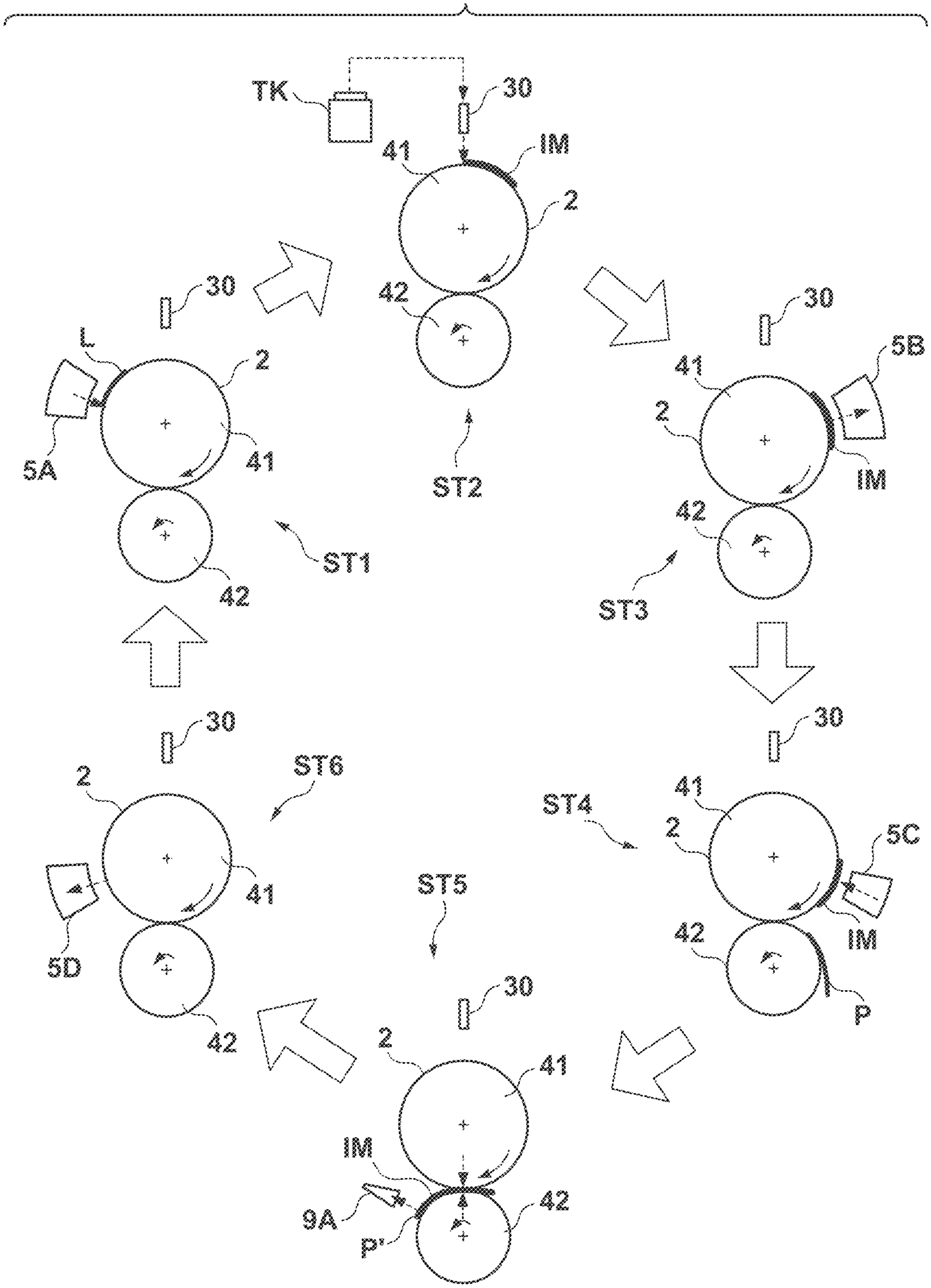
FIG. 6 is an explanatory view showing an example of the operation of the printing system in FIG. 1.

FIG. 6 is a view schematically showing an example of a printing operation. Respective steps below are performed cyclically while rotating the transfer drum 41 and the pressurizing drum 42. As shown in a state ST1, first, a reactive liquid L is applied from the application unit 5A onto the transfer member 2. A portion to which the reactive liquid L on the transfer member 2 is applied moves along with the rotation of the transfer drum 41. When the portion to which the reactive liquid L is applied reaches under the printhead 30, ink is discharged from the printhead 30 to the transfer member 2 as shown in a state ST2. Consequently, an ink image IM is formed. At this time, the discharged ink mixes with the reactive liquid L on the transfer member 2, promoting coagulation of the coloring materials. The discharged ink is supplied from the reservoir TK of the supply unit 6 to the printhead 30.

The ink image IM on the transfer member 2 moves along with the rotation of the transfer member 2. When the ink image IM reaches the absorption unit 5B, as shown in a state ST3, the absorption unit 5B absorbs a liquid component from the ink image IM. When the ink image IM reaches the heating unit 5C, as shown in a state ST4, the heating unit 5C heats the ink image IM, a resin in the ink image IM melts, and a film of the ink image IM is formed. In synchronism with such formation of the ink image IM, the conveyance apparatus 1B conveys the print medium P.

As shown in a state ST5, the ink image IM and the print medium P reach the nip portion between the transfer member 2 and the pressurizing drum 42, the ink image IM is transferred to the print medium P, and the printed product P' is formed. Passing through the nip portion, the inspection unit 9A captures an image printed on the printed product P' and inspects the printed image. The conveyance apparatus 1B conveys the printed product P' to the collection unit 8*d*.

When a portion where the ink image IM on the transfer member 2 is formed reaches the cleaning unit 5D, it is cleaned by the cleaning unit 5D as shown in a state ST6. After the cleaning, the transfer member 2 rotates once, and transfer of the ink image to the print medium P is performed repeatedly in the same procedure. The description above has been given such that transfer of the ink image IM to one print medium P is performed once in one rotation of the transfer member 2 for the sake of easy understanding. It is possible, however, to continuously perform transfer of the ink image IM to the plurality of print media P in one rotation of the transfer member 2.

Each printhead 30 needs maintenance if such a printing operation continues.

Figure 7:
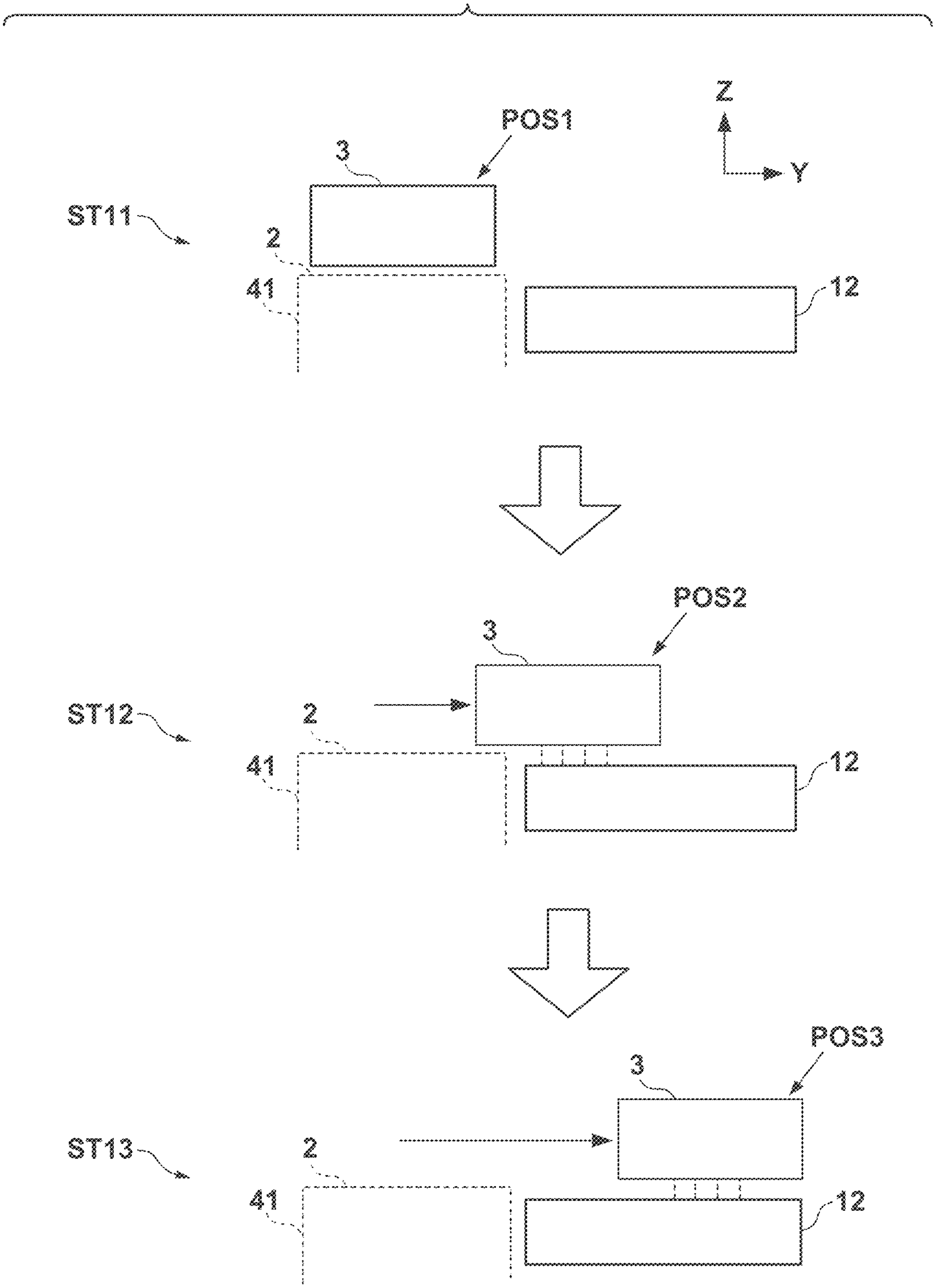
FIG. 7 is an explanatory view showing an example of the operation of the printing system in FIG. 1.

FIG. 7 shows an operation example at the time of maintenance of each printhead 30. A state ST11 shows a state in which the print unit 3 is positioned at the discharge position POS1. A state ST12 shows a state in which the print unit 3 passes through the preliminary recovery position POS2. Under passage, the recovery unit 12 performs a process of recovering discharge performance of each printhead 30 of the print unit 3. Subsequently, as shown in a state ST13, the recovery unit 12 performs the process of recovering the discharge performance of each printhead 30 in a state in which the print unit 3 is positioned at the recovery position POS3.

<Arrangement of Printhead>

Figure 12:
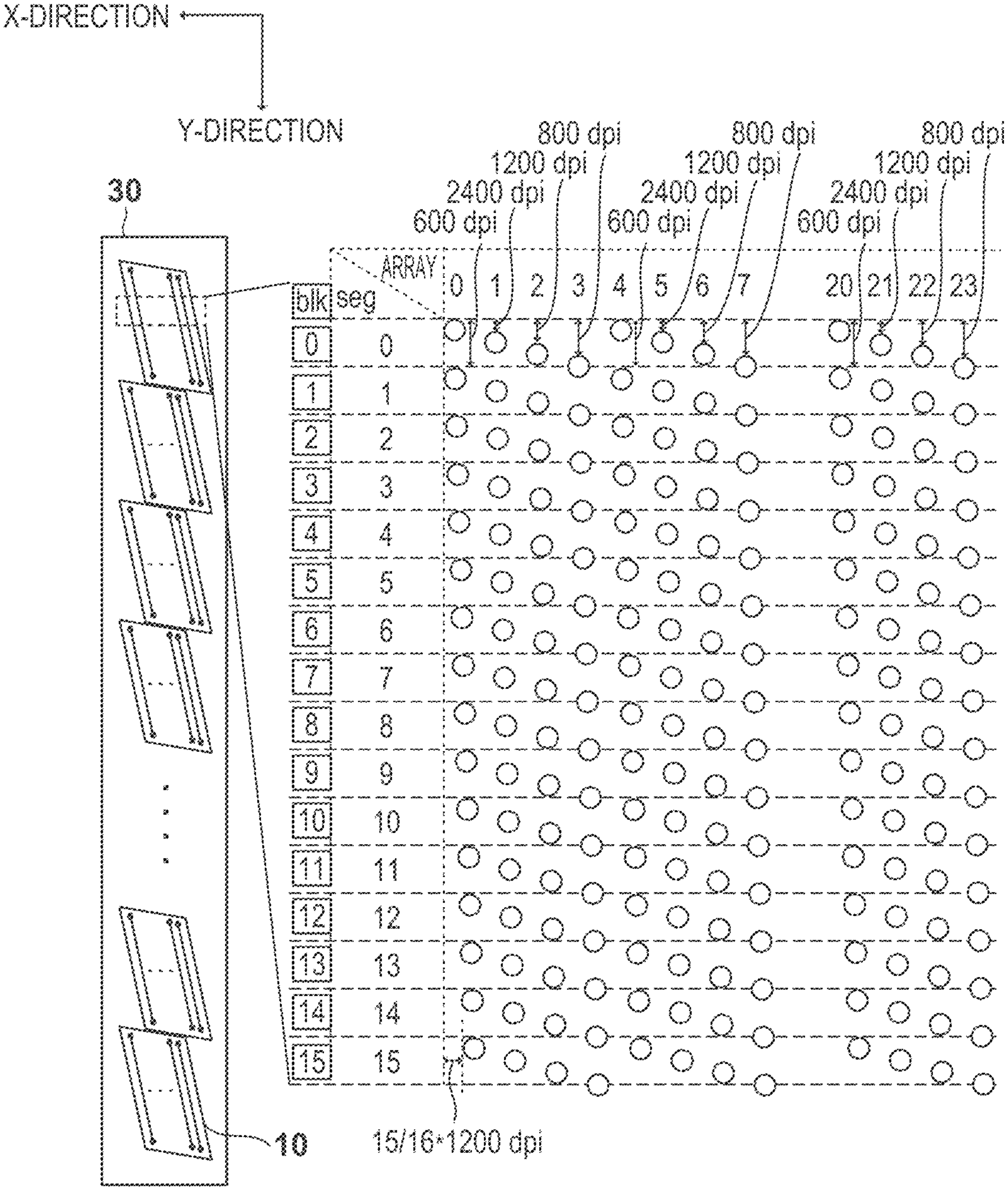
FIG. 12 is a view showing a printhead 30 when viewed from an ink discharge surface side.

FIG. 12 is a view showing the printhead 30 when viewed from an ink discharge surface side.

As shown in FIG. 12, the printhead 30 is formed by connecting the plurality of parallelogram-shaped head chips (head substrates) 10 in the Y direction. In each head chip, 24 nozzle arrays are arranged, and nozzles forming each nozzle array are obliquely arranged in the X direction at a pitch with a resolution of 600 dpi. Although the nozzles of each nozzle array are arrayed at a pitch with a resolution of 600 dpi, the nozzles are arranged while being shifted by ¼ pitch in the nozzle array direction between the arrays. Therefore, it is possible to achieve printing at a resolution of 2,400 dpi by using four successive nozzle arrays in combination, for example, arrays 0 to 3, arrays 4 to 7, and the like in combination.

Referring to FIG. 12, a number indicated by blk represents a block number assigned to each nozzle. In this embodiment, assuming that the printing resolution in the X direction on the print medium is 1,200 dpi, the nozzles assigned with the block numbers are time-divisionally selected and the selected print elements (heaters) are driven to print an image. In time-divisional driving, the nozzles of each nozzle array are divided into a plurality of groups by setting, as one group, 16 nozzles (seg 0 to seg 15) successive in the Y direction, and then the nozzles of each group are sequentially driven. As a result, with respect to printing of an identical pixel in the X direction, seg 15 is driven at a delayed timing so that a position shifts by a distance corresponding to (15/16)×1,200 dpi with respect to seg 0. Printing is executed by time-divisional driving for each column adjacent in the X direction in the same manner.

Figure 13:
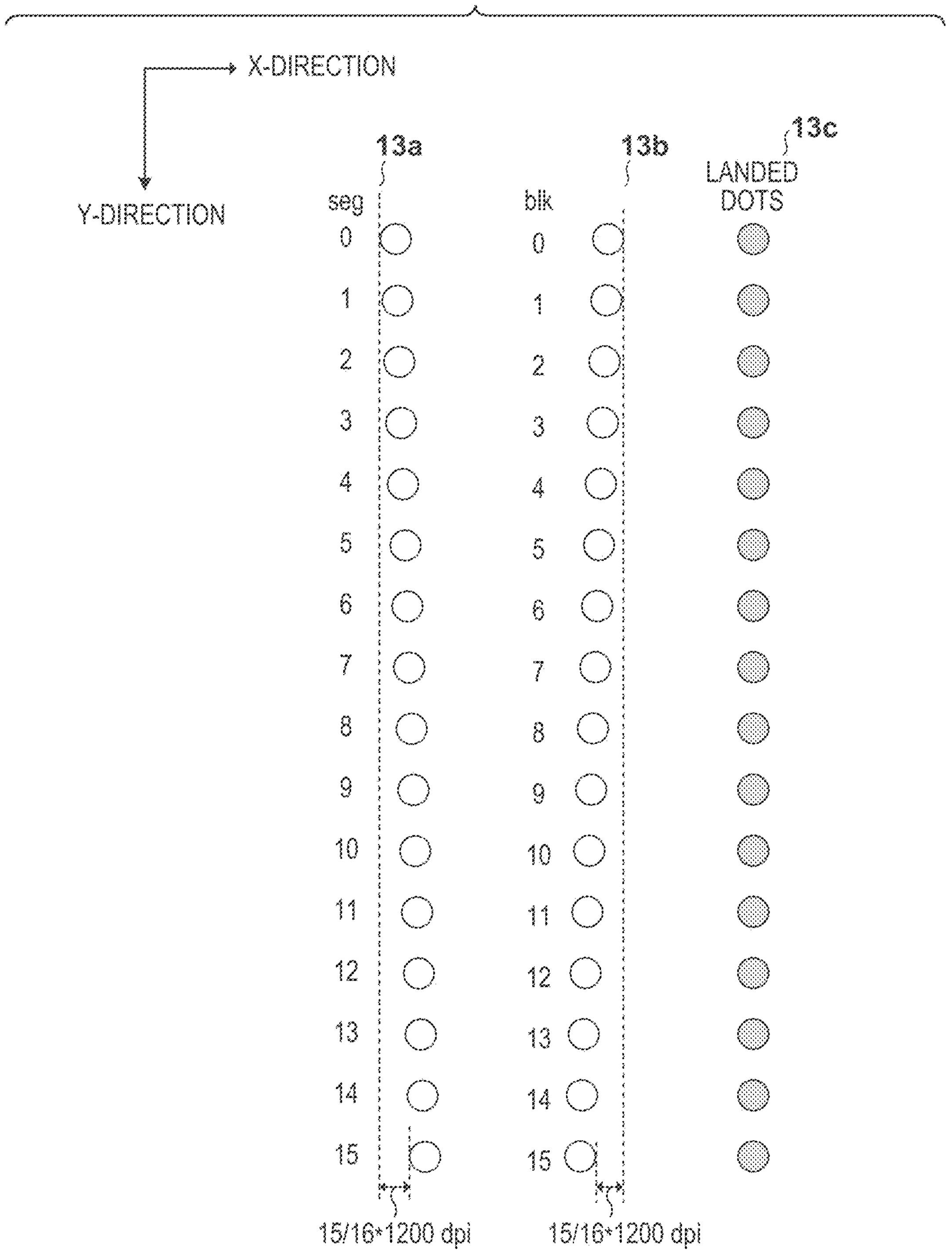
FIG. 13 is a view showing a nozzle array, time-divisional driving, and landing.

FIG. 13 is a view showing a nozzle array, time-divisional driving, and landing.

The successive 16 nozzles forming one group in time-divisional driving will now be described. Referring to FIG. 13, as indicated by 13*a*, the 16 nozzles are arranged while being shifted in the X direction. Time-divisional driving timings are set, as indicated by 13*b*, so as to solve this shift in the direction of landing shift amounts of ink droplets. By executing such time-divisional driving, ink droplet landing is straight in the Y direction, as indicated by 13*c*. When X represents the number of nozzles in a group, the nozzles are arranged so that each nozzle shifts by 1/X as a driving ordinal number increases by one.

Note that FIG. 13 shows an example in which the 16 nozzles are arranged while being shifted by an amount corresponding to (1/16)×1,200 dpi in the X direction with respect to a landing shift amount generated by time-divisionally driving the 16 nozzles. Assuming that X generally represents the number of nozzles of one group in time-divisional driving, it can also be said that the X nozzles are arranged by an amount corresponding to (1/X) pixel. However, only some of the 16 nozzles may be arranged while being shifted in the X direction.

Position Shift Correction Method of Printhead

First Embodiment

A position shift detection method and correction method of a printhead will now be described.

Figure 14:
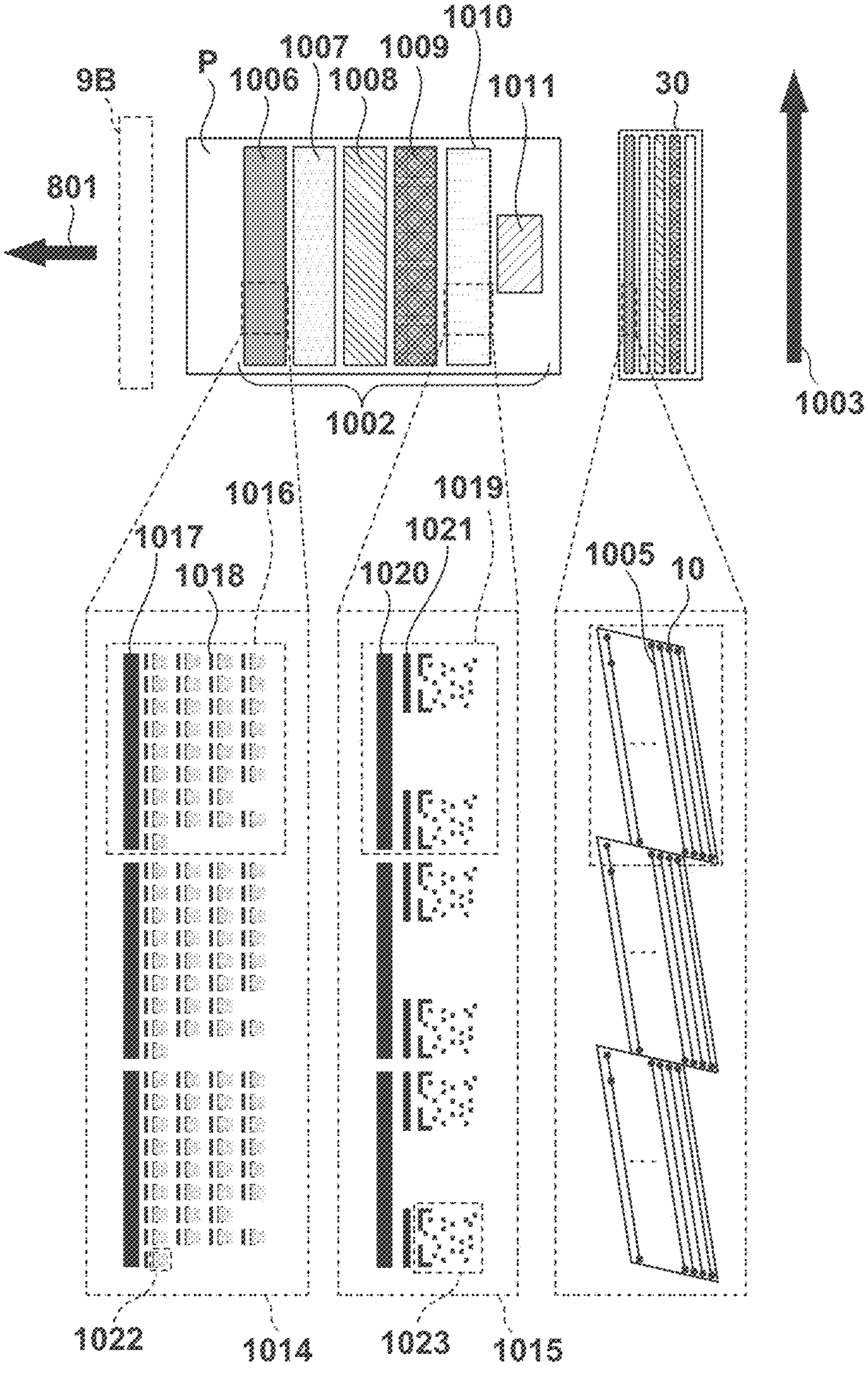
FIG. 14 is a view for explaining the positional relationship among a print medium, the printhead, and the inspection unit, the printing position of a test pattern, and head position shift correction.

FIG. 14 is a view for explaining the positional relationship among a print medium, a printhead, and an inspection unit, the printing position of a test pattern, and head position shift correction. FIG. 14 shows an example of printing a test pattern 1002 for head position shift correction using a cut sheet as a print medium P. Note that the test pattern fits in one cut sheet used here but two test patterns may be printed depending on the size of a cut sheet. An arrow 1003 indicates the nozzle array direction of a printhead 30.

The plurality of printheads 30 to be described in this embodiment correspond to five colors of K (black), M (magenta), C (cyan), Y (yellow), and clear inks, respectively, from the downstream side with respect to the conveyance direction of the print medium P. However, the color order of inks discharged by the printheads may be different, printheads corresponding to other colors such as G (gray), LM (light magenta), and LC (light cyan) may be added, or the printheads may change.

An inspection unit 9B is arranged on the downstream side in the conveyance direction of the print medium P with respect to the printheads 30. The inspection unit 9B reads the test pattern 1002 printed on the print medium P to detect position shift amounts of the printheads 30.

Each printhead 30 is formed by a plurality of head chips 10, as described above. In this example, assume that each printhead 30 is formed by the 36 head chips 10. However, the number of head chips may change. In each head chip 10, 24 nozzle arrays 1005 are arranged. Note that the number of nozzle arrays is not limited to this, and another number is possible. However, in consideration of the fact that four nozzle arrays achieve a printing resolution of 2,400 dpi, as described above, the number of nozzle arrays is desirably an integer multiple of 4.

The types of head position shifts will be described next. These shifts are caused by a manufacturing error of a head chip or nozzle of a printhead, a head chip arrangement error, or the like.

The shifts include an inter-array shift between the nozzle arrays 1005 in the head chip 10, an inter-chip shift between the head chips 10, and an inter-color shift between the plurality of printheads 30. These shifts cause the landing position of an ink droplet to shift from an ideal position, thereby deteriorating the quality of a printed image. Head position shift correction is a function of correcting the landing position of ink by changing the ink discharge timing of the head chip 10 or a discharge nozzle.

With respect to a shift in a direction perpendicular to the arrow 1003, the position shift of a formed dot is corrected by changing the discharge timing of each head chip 10 forming the printhead 30. With respect to a shift in the direction of the arrow 1003, a position shift is corrected by changing print data. With respect to the slant of the printhead 30, a position shift is corrected by rotating the printhead 30 by the actuator 33, as described above.

The test pattern 1002 is a test pattern for performing head position shift correction of each printhead 30. Furthermore, the test pattern 1002 includes test patterns 1006 to 1010 in correspondence with the five printheads 30, and each test pattern is a test pattern used to detect a position shift amount corresponding to each printhead 30. In other words, the test patterns 1006 to 1010 are test patterns corresponding to K ink, C ink, M ink, Y ink, and clear ink, respectively. Using each of the test patterns, the head slant amount of the corresponding printhead 30, an inter-array shift amount between the nozzle arrays of each head chip, and an inter-chip shift between the head chips are calculated.

Note that the test patterns forming the test pattern 1002 may increase/decrease from the number corresponding to the five printheads, and the order of the test patterns may change. Furthermore, a test pattern 1011 is a test pattern used to calculate an inter-color shift amount between the plurality of printheads. This point will be described in detail later with reference to FIG. 17.

FIG. 14 shows a pattern 1014 obtained by enlarging part of the test pattern 1006 corresponding to K ink. However, the enlarged patterns (not shown) of the test patterns 1007 to 1009 corresponding to C, M, and Y inks have the same shape as that of the test pattern 1006. FIG. 14 also shows a pattern 1015 obtained by enlarging part of the test pattern 1010 corresponding to clear ink. Note that these patterns are merely examples, and the correspondence between each test pattern and each ink color according to the type of the printhead may be changed.

Since enlarged patterns are used for the pattern 1015, as compared with the pattern 1014, even if a difference between the brightness values of a printing color and clear ink as an underground color of the print medium P is small, it is possible to improve the detection accuracy. Note that in the pattern 1014, an area 1016 is a pattern corresponding to one of the head chips that respectively discharge each of K, C, M, and Y inks. In the pattern 1015, an area 1019 is a pattern corresponding to one of the head chips that discharges clear ink.

In each of the patterns 1014 and 1015, an area represented by black is an area printed by a corresponding printing color. An area represented by white is not an area printed by a printing color but an area of the underground color of the print medium P.

As shown in FIG. 12, the printhead 30 has the arrangement in which the plurality of head chips 10 are linearly arranged. For each head chip 10, the pattern 1016 or 1019 corresponding to the head chip 10 is linearly printed in parallel with the nozzle array direction 1003.

The arrangements of the patterns 1016 and 1019 corresponding to the head chips and a printing method will now be described.

The pattern 1016 corresponding to the head chip is formed by a detection mark 1017, alignment marks 1018, and patterns 1022 for pattern matching. On the other hand, the pattern 1019 corresponding to the head chip is formed by a detection mark 1020, alignment marks 1021, and patterns 1023 for pattern matching.

The detection mark 1017 or 1020 is a pattern used to detect the pattern corresponding to the head chip in a read image in image analysis processing, and is a pattern printed in a rectangular area, as shown in FIG. 14. Since each head chip includes the plurality of nozzle arrays, the detection mark 1017 or 1020 is printed by ink discharge by the plurality of nozzle arrays. When executing printing using the plurality of nozzle arrays, even if there is a discharge failure nozzle, a nozzle of another nozzle array discharges ink, and thus a defect in the detection pattern caused by the discharge failure nozzle is reduced. This makes it possible to detect the detection mark stably in image analysis processing.

Each alignment mark 1018 or 1021 is a pattern for calculating the reference position of the analysis area of the pattern 1022 or 1023 for pattern matching in the image analysis processing. The alignment mark 1018 or 1021 is a pattern printed in a rectangular area, as shown in FIG. 14, and is printed by ink discharge from the plurality of nozzle arrays for each pattern 1022 or 1023 for pattern matching corresponding to each nozzle array.

The patterns 1022 or 1023 for pattern matching are patterns for detecting the position shift of the head in the image analysis processing, and the patterns 1022 or 1023 for pattern matching are used in accordance with a printing color or the type of the calculated shift amount.

Since, as for the pattern formed by clear ink, a signal difference between the brightness values of the underground color and the printing color of the print medium P is hardly obtained, a position shift is detected using the enlarged patterns 1023 for pattern matching.

FIGS. 15A and 15B are views respectively showing the detailed layouts of the patterns 1022 and 1023 for pattern matching.

Referring to FIG. 15A, YP represents the number of pixels in the vertical direction of the pattern 1022 for pattern matching and XP represents the number of pixels in the horizontal direction. Referring to FIG. 15B, YPL represents the number of pixels in the vertical direction of the pattern 1023 for pattern matching and XPL represents the number of pixels in the horizontal direction.

In this embodiment, YP is in a direction perpendicular to the nozzle array direction 1003 and XP is in a direction parallel to the nozzle array direction 1003. YP and XP have a value of 82 pixels at a unit of 1,200 dpi. Furthermore, YPL is in a direction perpendicular to the nozzle array direction 1003 and XPL is in a direction parallel to the nozzle array direction 1003. YPL and XPL have a value of 210 pixels at a unit of 1,200 dpi. Note that other values may be used as the numbers of pixels.

Figure 16A:
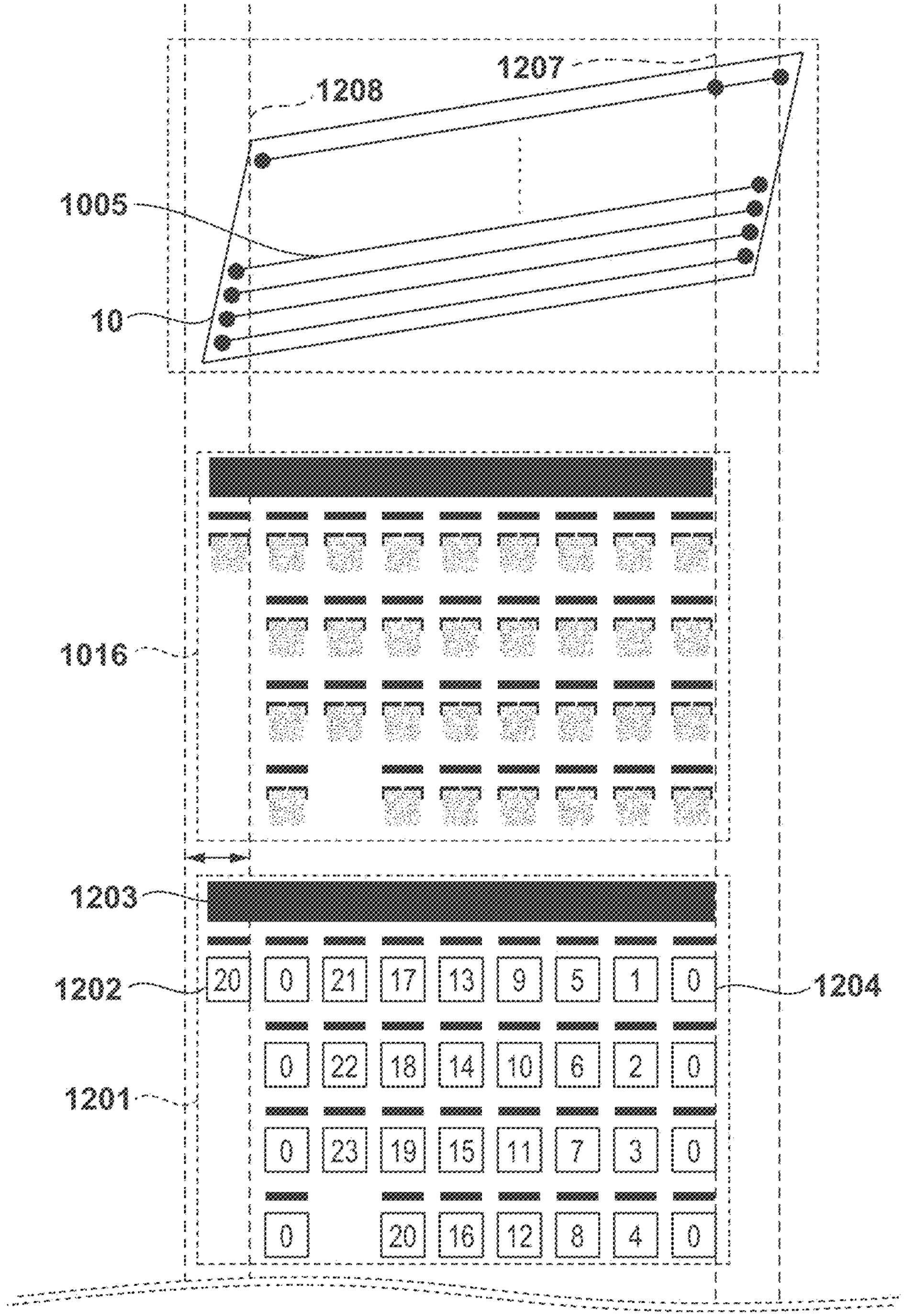
FIGS. 16A and 16B are views for explaining the correspondence between nozzles and a pattern corresponding to a head chip.
Figure 16B:
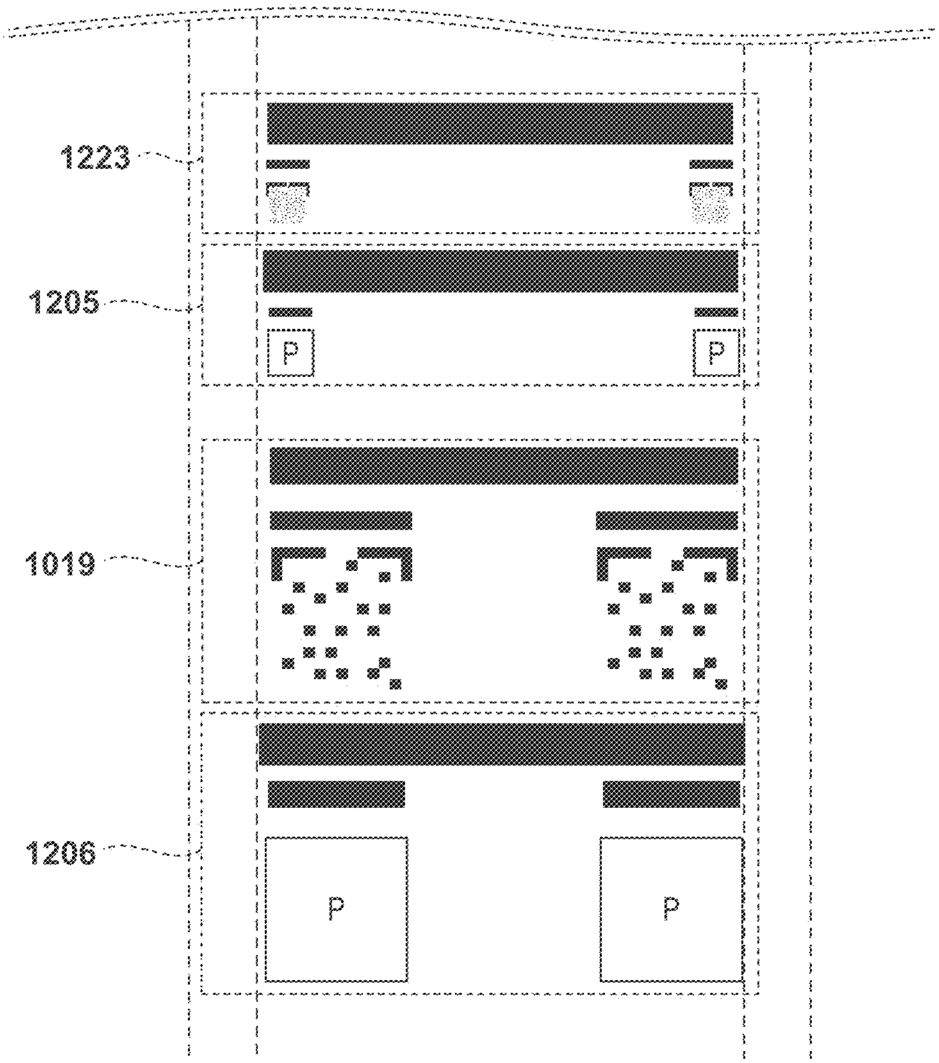

FIGS. 16A and 16B are views each showing the correspondence between the discharge nozzles and the pattern 1016 or 1019 corresponding to the head chip.

Each nozzle array 1005 of the head chip 10 is formed from a plurality of nozzles. In this example, 24 nozzle arrays are arranged in one head chip. A test pattern for one head chip is printed using nozzles within a range indicated by broken lines 1207 and 1208 among the nozzles of the nozzle arrays of the head chip. Note that this range may be different in accordance with the arrangement of the head chip.

Each of the patterns for pattern matching of the pattern 1016 for one head chip is a pattern corresponding to a nozzle array of a number within a test pattern 1201, and is printed using the nozzle array of the corresponding number. In accordance with the arrangement of the nozzles for printing the test pattern 1201, a position shift is calculated based on a relative position with respect to each of the remaining nozzles with reference to the pattern of array 0. However, the pattern 1022 for pattern matching indicated by an area 1202 as an exception is a pattern for pattern matching printed by a nozzle array 20 of the adjacent head chip on the left. Therefore, since this pattern is not a pattern printed by the inspection target head chip, it is not used to calculate a position shift of the nozzle array.

The pattern 1016 is printed for each head chip, and the slant of the head and a position shift caused by a manufacturing error of each chip are calculated based on one pattern for pattern matching for one nozzle of each pattern 1016. An inter-chip shift between the head chips and the slant of the head are calculated by using, as a reference chip, the head chip corresponding to the pattern 1016 printed one pattern inside from the left or right end on the print medium P. The size of the print medium P is variable. This may obtain a pattern in which the pattern 1016 at the left or right end of the print medium P lacks. In the case of such pattern, if a pattern of a length equal to or longer than an area 1203 is printed, a right end area 1204 or the left end area 1202 is selected as a pattern for calculation.

Depending on the printhead, a test pattern for one head chip may have a layout shown in the area 1023, instead of the pattern 1016. Each pattern 1022 for pattern matching at this time corresponds to nozzles for printing an area 1205. In the area 1205, P indicates printing of the pattern 1022 for pattern matching by a plurality of nozzles, and is used to calculate the slant of the printhead.

Each pattern 1023 for pattern matching of the test pattern 1019 for one head chip corresponds to nozzles for printing an area 1206. In the area 1206, P indicates printing of the pattern 1023 for pattern matching by a plurality of nozzles, and is used to calculate the slant of the printhead.

The pattern 1016 or 1023 for one head chip is printed by shifting the timing of printing on the print medium P by an amount obtained by considering tolerance of a manufacturing error of a nozzle and that of a head chip. Therefore, overlapping of the test patterns caused by the errors is prevented.

Figure 17:
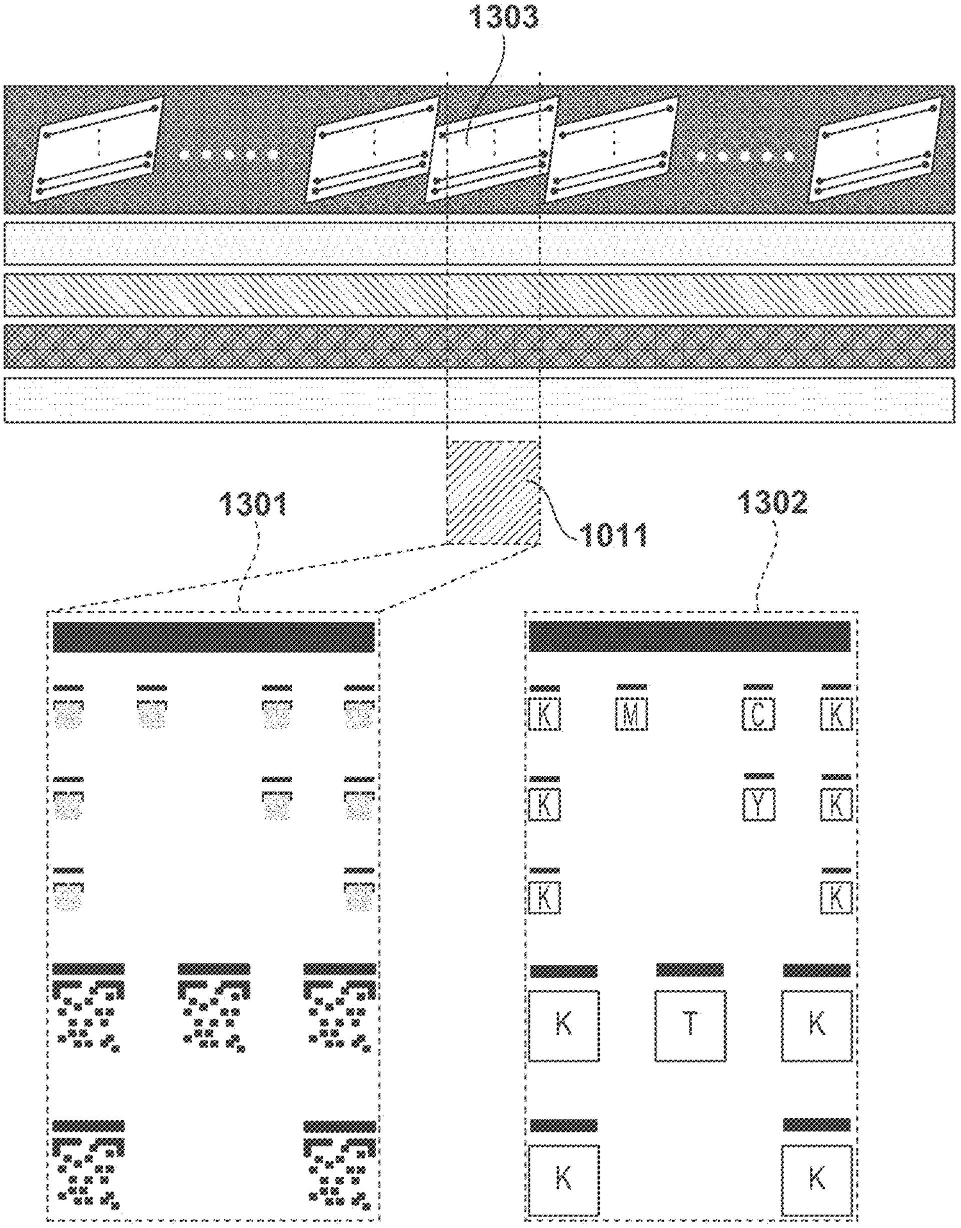
FIG. 17 is a view showing the correspondence among the printheads, the head chips, and a test pattern for performing inter-color shift correction calculation between the printheads.

FIG. 17 is a view showing the correspondence among the printheads, the head chips, and a test pattern for performing inter-color shift correction calculation between the printheads.

A position error between the printheads 30 is calculated using a test pattern 1301 shown in FIG. 17. For this calculation, a pattern 1302 is printed using the printhead that discharges a corresponding ink color. In each printhead, one head chip 1303 to be used to print the pattern is selected from the plurality of head chips 10. In this example, the test pattern 1011 is printed using the head chip 1303. In the test pattern 1301, a portion represented by black is a portion of a pattern printed by a corresponding printing color, and a portion represented by white is a portion of the underground color of the print medium P.

Referring to FIG. 17, the pattern 1022 for pattern matching is used for printing by each ink indicated by K, C, M, or Y, and the pattern 1023 for pattern matching is used for printing by clear ink indicated by T. In this example, the pattern 1302 is printed using, as a reference head, the printhead that discharges K ink, and the position shift of each printhead is calculated. As the pattern of the reference head, the same pattern as the pattern for pattern matching for the printing color of a shift calculation target is used. Note that the corresponding pattern for pattern matching may be changed in accordance with the color.

Note that the test pattern 1301 for calculating the inter-color shift between the printheads is printed by shifting the timing of printing on the print medium P by exceeding a maximum shift amount of the inter-color shift between the printheads. As described above, overlapping of the test patterns is prevented by shifting the printing timing of each printhead.

Calculation of Shift Amount Between Nozzle Arrays

Figure 18:
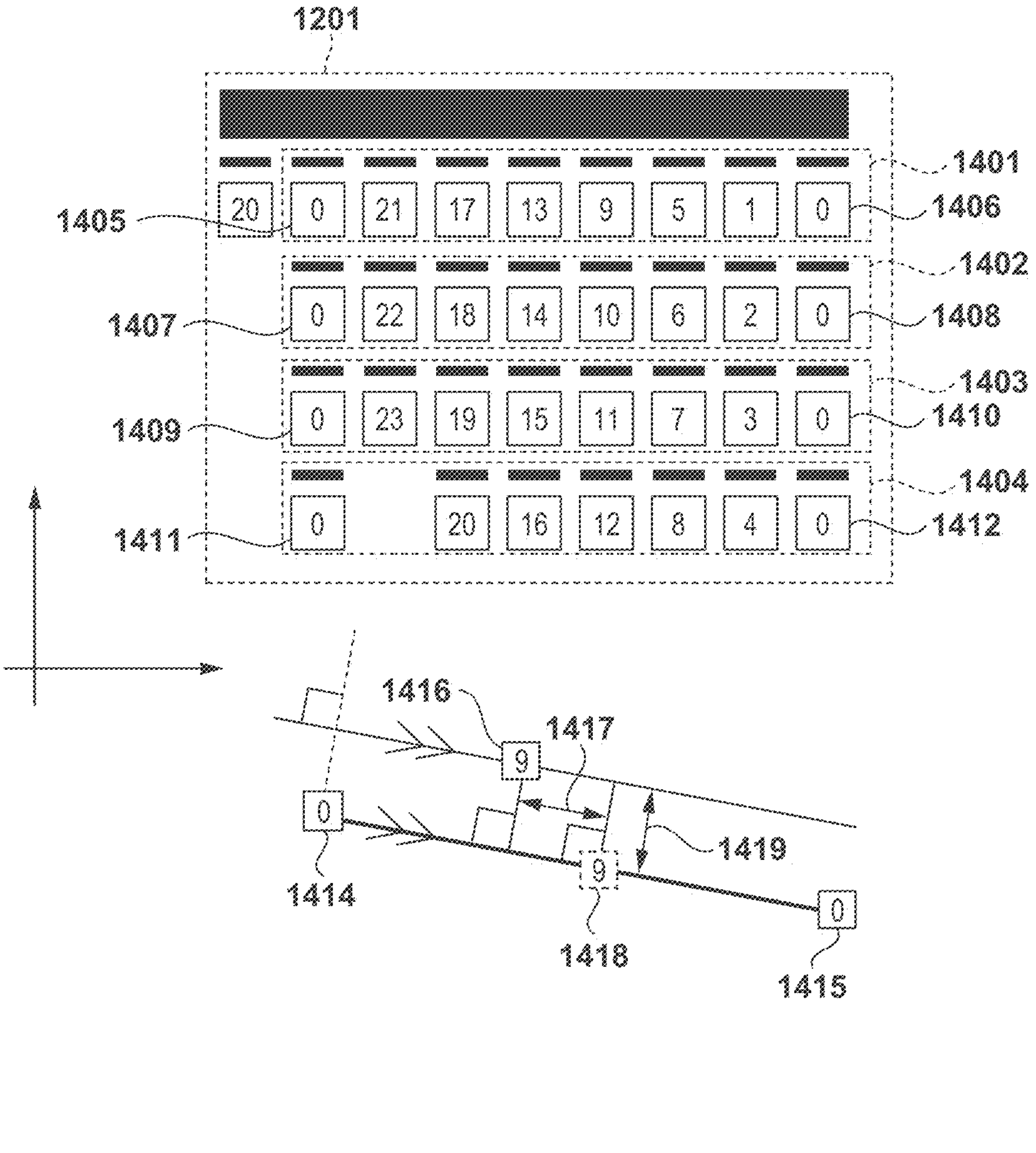
FIG. 18 is a view showing a method of calculating a shift amount between nozzle arrays.

FIG. 18 is a view showing a method of calculating a shift amount between the nozzle arrays.

In this embodiment, 24 nozzle arrays are arranged in one head chip, and are numbered by setting, as the 0th array, the first nozzle array from the downstream side with respect to the conveyance direction of the print medium P, and setting the last nozzle array as the 23rd array. These nozzle arrays will be referred to as nozzle arrays 0 to 23, respectively.

A method of calculating the shift amount between the nozzle arrays will be described using a scan image obtained by reading, by a scanner, a pattern printed in accordance with the layout of the test pattern 1201 shown in FIG. 18.

In the test pattern 1201, a numerical value shown in each rectangle indicates the number of each nozzle array used to print the pattern for pattern matching, as described with reference to FIG. 16A. For example, it is indicated that the pattern 1405 for pattern matching is printed using nozzle array 0.

A pattern printed using nozzle array x will be referred to as an array x pattern hereinafter.

As shown in FIG. 18, the test pattern 1201 is divided into four areas including areas 1401 to 1404. In the area 1401, array 0 patterns 1405 and 1406 are set as references. Similarly, in the areas 1402, 1403, and 1404 as well, array 0 patterns 1407 and 1408, array 0 patterns 1409 and 1410, and array 0 patterns 1411 and 1412 are set as references, respectively. In each of the areas 1401 to 1404, a shift amount with respect to the pattern printed using another nozzle array is calculated with reference to the two array 0 patterns.

As an example, a method of calculating a shift amount between nozzle arrays 0 and 9 will be described.

In a lower view of FIG. 18, an array 0 pattern 1414 and an array 0 pattern 1415 correspond to the array 0 pattern 1405 of the area 1401 and the array 0 pattern 1406 of the area 1401, respectively, and are set as references. Furthermore, an array 9 pattern 1416 corresponds to an array 9 pattern printed in the area 1401.

When printing the patterns by nozzle arrays 0 and 9, if there is no landing position shift, the patterns are arranged so that the array 9 pattern is printed on a straight line connecting the array 0 patterns 1414 and 1415. If there is no landing position shift, an array 9 pattern 1418 is printed at an ideal position.

A shift amount between the printing position of the array 9 pattern 1416 and the array 9 pattern 1418 printed at the ideal position corresponds to a position shift amount of nozzle array 9 with respect to nozzle array 0. The shift amount is represented by a horizontal direction component 1417 and a vertical direction component 1419.

The vertical direction component 1419 of the shift amount is the length of a normal drawn from the array 9 pattern 1416 to the straight line connecting the array 0 patterns 1414 and 1415. Therefore, the vertical direction component 1419 of the shift amount can be calculated from the positions of the array 0 patterns 1414 and 1415 and the array 9 pattern 1416. Similarly, the horizontal direction component 1417 of the shift amount can also be obtained from these positions.

By applying the above-described method, the shift amounts of the array 1 pattern to the array 23 pattern are calculated with reference to the array 0 patterns, thereby obtaining the position shift amounts of nozzle arrays 1 to 23 with respect to nozzle array 0.

Calculation of Shift Amount between Head Chips and Slant Amount of Printhead

Figure 19:
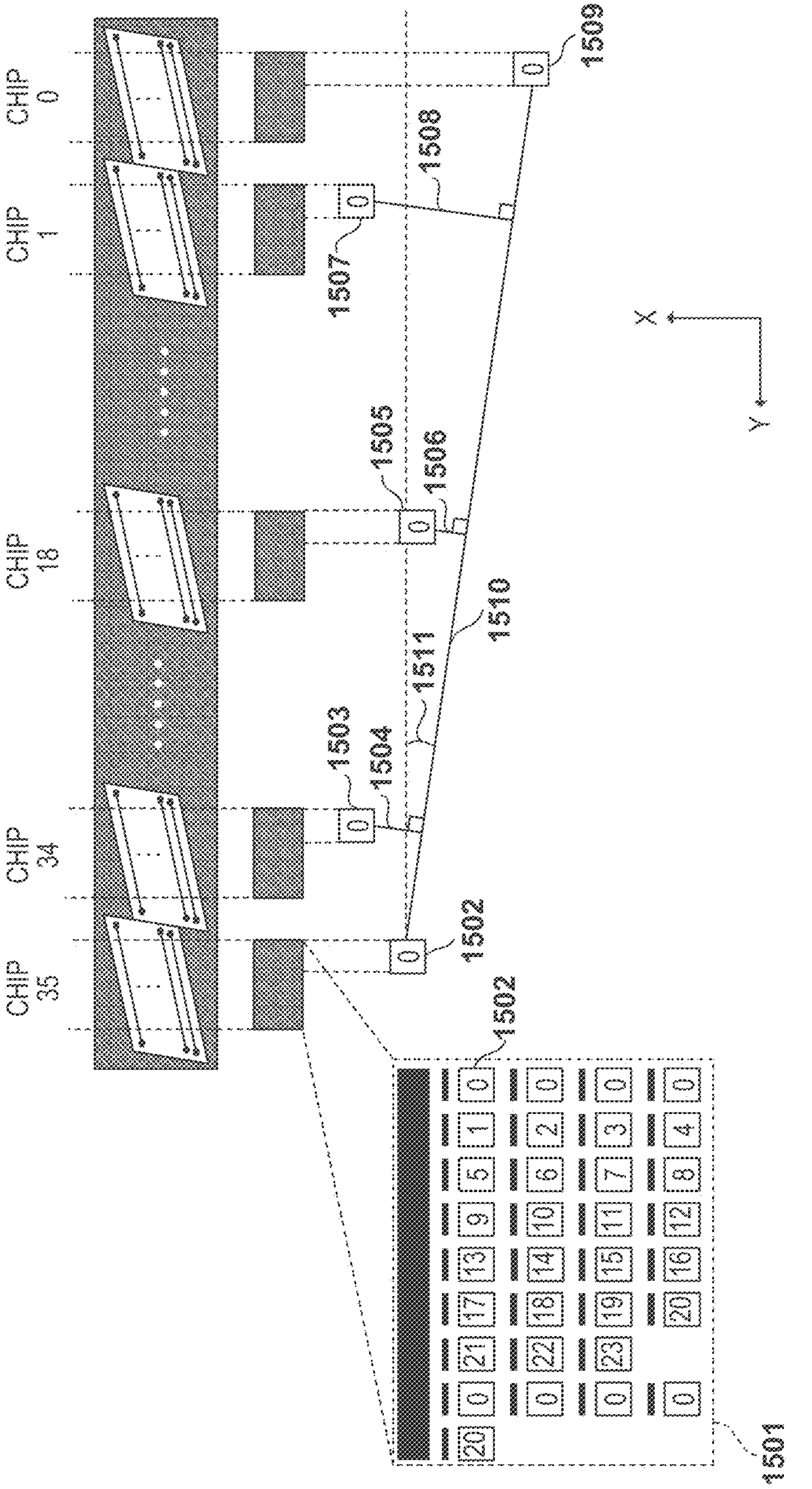
FIG. 19 is a view showing a method of calculating a shift amount in the X direction between head chips and a slant amount of the printhead.

FIG. 19 is a view showing a method of calculating a shift amount in the X direction between the head chips and the slant amount of the printhead.

In this example, 36 head chips are arranged in one printhead, and are numbered by setting, as chip 0, the first head chip from the back side in the depth direction (a direction perpendicular to the paper surface in FIG. 1) of the printing apparatus, and setting the last head chip as chip 35. Referring to FIG. 19, the right side indicates the back side of the printing apparatus and the left side indicates the front side of the printing apparatus.

A method of calculating the slant amount of the printhead and a shift amount between the head chips will be described with reference to FIG. 19 using a scan image obtained by reading, by the scanner, the pattern printed in accordance with the layout of the test pattern 1201.

FIG. 19 shows a pattern 1501 printed in accordance with the layout of the test pattern 1201 using chip 35, and the pattern includes a tile pattern 1502 printed by nozzle array 0.

A slant 1511 obtained based on a reference line 1510 for obtaining the slant of a line connecting the barycenter of the pattern 1502 printed by chip 35 and that of a pattern 1509 printed by chip 0 indicates a slant with respect to the sensor of the inspection unit 9B. A shift amount in the X direction between the chips is given by the distance of a normal from the barycenter of the tile pattern printed by nozzle array 0 of each chip to the reference line 1510.

For example, a distance 1504 of a normal from the barycenter of a tile pattern 1503 printed by nozzle array 0 of chip 34 to the reference line 1510 corresponds to the inter-chip shift amount of chip 34 in the X direction. Similarly, a distance 1506 of a normal from the barycenter of a tile pattern 1505 printed by nozzle array 0 of chip 18 to the reference line 1510 corresponds to the inter-chip shift amount of chip 18 in the X direction. Similarly, a distance 1508 of a normal from the barycenter of a tile pattern 1507 printed by nozzle array 0 of chip 1 to the reference line 1510 corresponds to the inter-chip shift amount of chip 1 in the X direction. Calculation is performed in the same manner for other chips (not shown).

The slant amount between the printheads is calculated based on the slant amount of a reference head and the slant amount of each head.

The printhead that discharges K ink is used as a reference head.

Let $\theta_K$, $\theta_C$, $\theta_M$, $\theta_Y$, and $\theta_T$ be slants with respect to the sensor of the inspection unit 9B, which are obtained from the reference lines of the respective printheads. Then, slant of printhead for C ink with respect to reference head $K=\theta\_C-\theta\_K$ slant of printhead for M ink with respect to reference head $K=\theta\_M-\theta\_K$ slant of printhead for Y ink with respect to reference head $K=\theta\_Y-\theta\_K$ slant of printhead for clear ink with respect to reference head $K=\theta\_T-\theta\_K$.

In accordance with the thus obtained slant amounts of the printheads for C ink, M ink, Y ink, and clear ink, the slants of the printheads are corrected by operating the actuators 33. The shift in the X direction between the head chips of each printhead is corrected by changing a discharge timing in accordance with the obtained shift amount between the chips.

Figure 20:
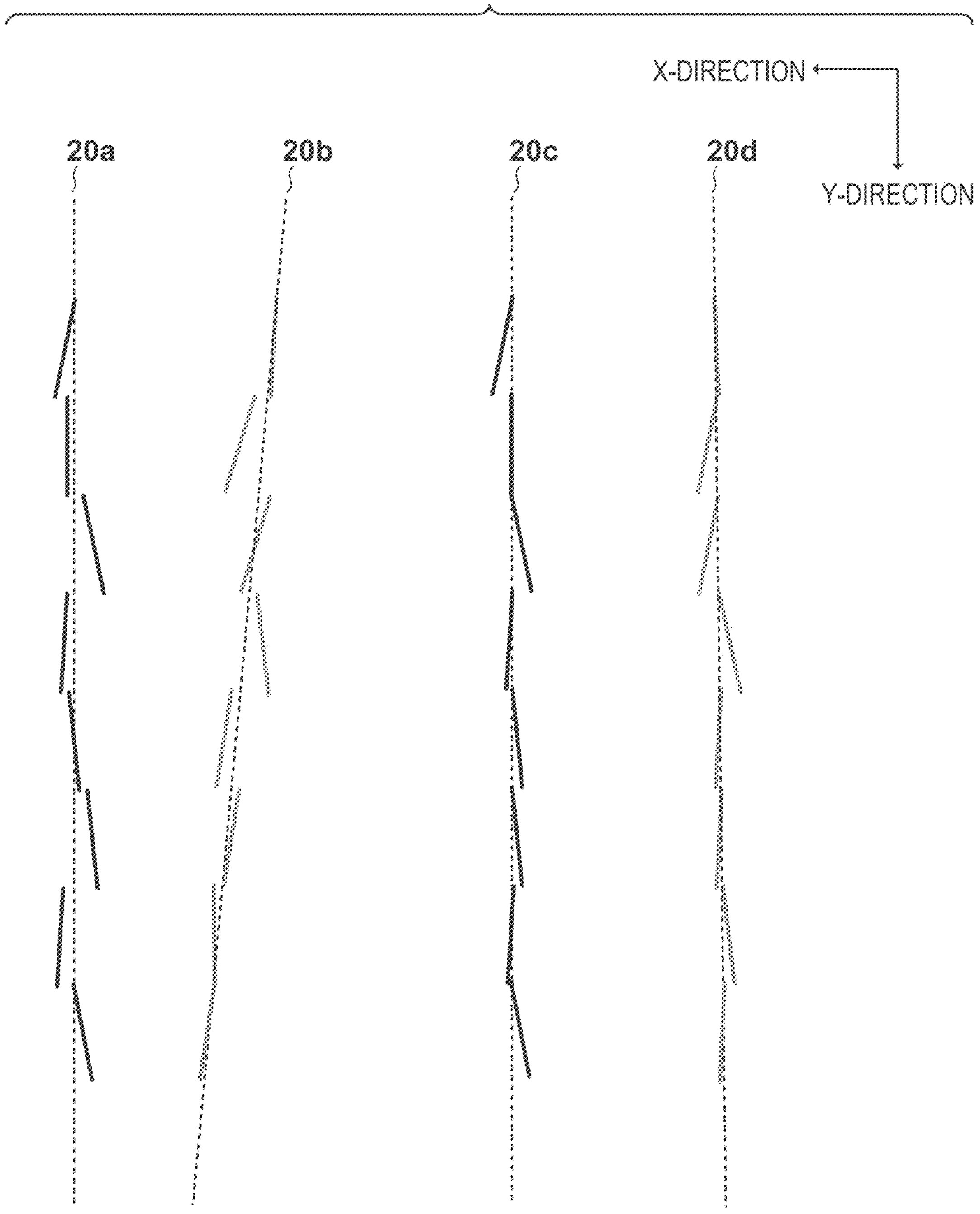
FIG. 20 is a view showing a state after correcting the slant of the printhead and the shift in the X direction between the head chips.

FIG. 20 is a view showing a state after correcting the slant of the printhead and the shift in the X direction between the head chips. In FIG. 20, reference numeral 20*a* shows reference head K, and reference numeral 20*b* shows the printhead before correction. A dotted line indicates the reference line 1510 shown in FIG. 18. Reference numeral 20*c* shows reference head K after correction of the shift between the head chips. No slant correction is performed for the reference head. Reference numeral 20*d* shows the printhead after correction of the slant and the shift in the X direction between the head chips.

Due to the above-described issue, no correction of the slant of each head chip is performed. A guarantee is offered by manufacturing tolerance of the head chip so that a shift of the printing position caused by the slant of each head chip is shorter than the length (one pixel=1,200 dpi) of one pixel in the X direction. In this way, while correcting the slant of the printhead, the quality of a printed character or a printed ruled line is improved.

Note that the example in which the plurality of printheads are provided and the slant of each printhead with respect to reference head K as one of the plurality of printheads is corrected has been described above. However, for example, in a printing apparatus including one printhead, a slant with respect to the sensor of the inspection unit 9B obtained based on the reference line of the one printhead may be corrected with a slant with respect to a scanner.

Shift Amount (Inter-Color Shift) Between Printheads

Figure 21:
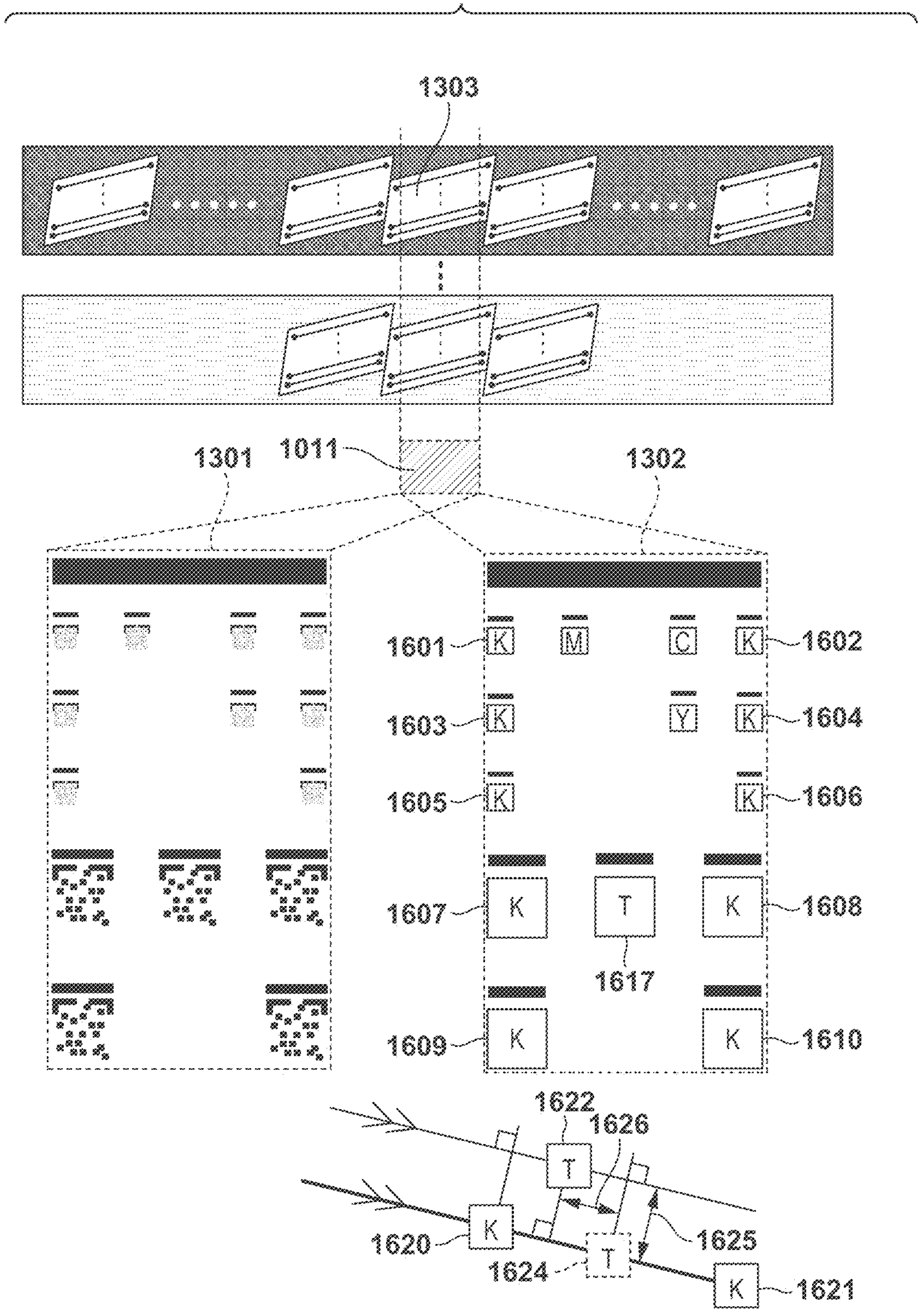
FIG. 21 is a view showing a method of calculating the shift amount between the printheads.

FIG. 21 is a view showing a method of calculating the shift amount between the printheads.

In the following description, the first printhead, from the downstream side in the conveyance direction of the print medium P, that discharges K ink will be referred to as head K hereinafter, and the printheads that discharge C ink, M ink, and Y ink will be referred to as head C, head M, and head Y, respectively, hereinafter. The printhead that discharges clear ink will be referred to as head T hereinafter.

A method of calculating a shift amount (to be referred to as an inter-color shift hereinafter) between the printheads using a scan image obtained by reading, by the scanner, a pattern printed in accordance with the layout of the pattern 1302 will now be described.

As shown in FIG. 21, the test pattern 1011 is printed by the head chip 1303 selected or designated from the plurality of head chips but the test patterns 1301 and 1302 are used to calculate the inter-color shift amount. In this example, chip 18 described with reference to FIG. 19 is selected. For the sake of descriptive convenience, a schematic pattern is shown in the test pattern 1301, and color inks (that is, printheads) to be used are shown in the pattern 1302.

As shown in the pattern 1302, patterns 1601 to 1610 are patterns printed by head K as the reference head. Patterns of other ink colors are calculation targets of the position shifts between the printheads. In this example, these patterns are patterns printed by C ink, M ink, Y ink, and T (clear) ink. The number of printing colors may increase/decrease. In the pattern 1302, an area where a pattern by another printhead is printed is ensured.

In this example, head C, head M, and head Y print the patterns 1022 for pattern matching shown in FIG. 15A. Therefore, the patterns 1022 for pattern matching are also printed in the K patterns 1601 to 1606 of the reference patterns corresponding to those patterns.

On the other hand, in a pattern 1617 by clear ink, the pattern 1023 for pattern matching shown in FIG. 15B is printed. Therefore, the patterns 1023 for pattern matching are also printed in the K patterns 1607, 1608, 1609, and 1610 of the reference patterns corresponding to that pattern.

Note that the reference head and the printheads as inter-color shift calculation targets use the same type of pattern for pattern matching.

In this embodiment, when calculating the shift amount between the reference head and another printhead, calculation is performed for each printhead using the same method. As an example, a method of calculating the shift amount between head K and head T will be described with reference to the lower view of FIG. 21.

In the lower view of FIG. 21, a pattern 1620 corresponds to the pattern 1607 shown in the upper view of FIG. 21, and a pattern 1621 corresponds to the pattern 1608. These patterns are patterns of the reference head printed by chip 18 of head K. Furthermore, a pattern 1622 corresponds to the pattern 1617, and is a pattern printed by chip 18 of head T, and a pattern of the printhead as a shift amount calculation target.

When printing the respective patterns by head K and head T, if there is no landing position shift, the patterns are arranged so that the pattern by head T is printed on a straight line connecting the patterns 1620 and 1621. Therefore, a pattern 1624 is printed by head T at an ideal position where there is no landing position shift.

As a shift between the pattern 1622 printed on the scan image and the pattern 1624 printed at the ideal position, a relative position shift occurs in head T with respect to head K, and a shift amount 1625 of the relative position shift is shown in FIG. 21. The shift amount 1625 is the length of a normal drawn from the pattern 1622 to the straight line connecting the patterns 1620 and 1621. Therefore, the shift amount 1625 can be obtained based on the positions of the patterns 1620, 1621, and 1622. In addition, when a straight line is drawn from the pattern 1624 in a direction perpendicular to the straight line connecting the patterns 1620 and 1621, a shift amount 1626 between the patterns 1624 and 1622 can be obtained.

In this embodiment, calculation of printhead position shift correction is also executed with respect to the direction perpendicular to the head position shift amount 1625. Therefore, the head position shift amount is calculated with respect to both the directions for the shift amounts 1625 and 1626.

By applying the above-described method, the inter-color shift amounts of the printheads except for head K can be obtained with respect to the reference head (head K).

Mark Detection

Figure 22:
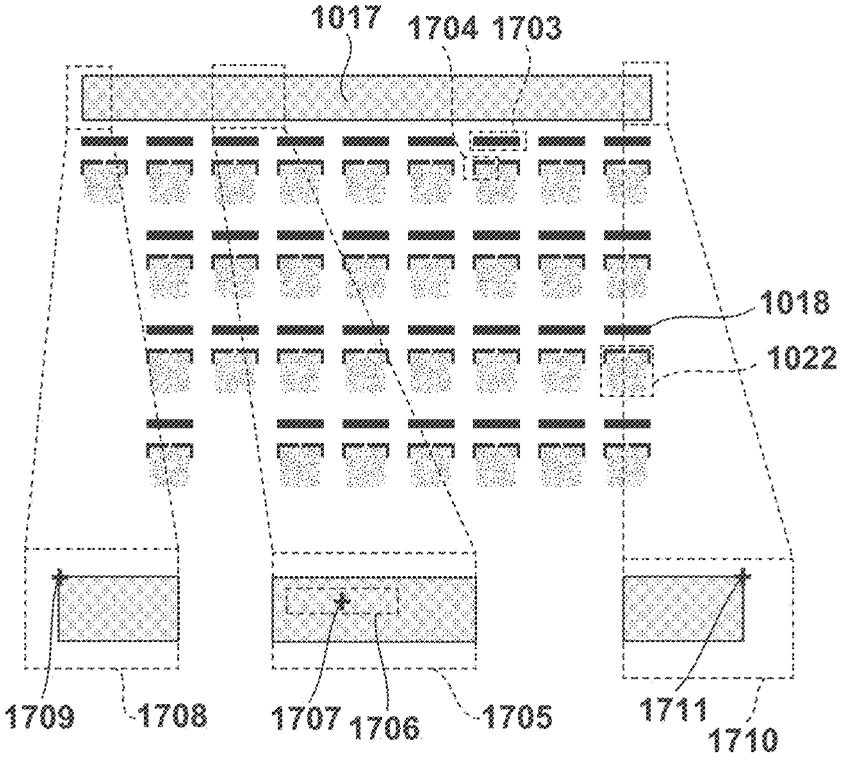
FIG. 22 is a view showing mark detection processing corresponding to the head chip.

FIG. 22 is a view showing mark detection processing corresponding to the head chip.

Processing of detecting the detection mark of the pattern corresponding to the head chip from the read image of the test pattern for shift amount calculation will be described.

FIG. 22 shows a pattern corresponding to each head chip, as indicated by the pattern 1016 shown in FIG. 16A. In this embodiment, as a test pattern corresponding to each head chip, there are three kinds of patterns 1016, 1019, and 1223 shown in FIGS. 16A and 16B. However, the same detection processing is performed. Furthermore, the same detection processing is performed for the test pattern 1301 shown in FIG. 17 for calculating a position error between the printheads 30. A description will be provided using, as an example, the pattern 1016 shown in FIG. 16A.

The mark detection processing roughly includes three steps.

In the first step, the detection mark 1017 is detected. The position of a test pattern for one head chip is estimated based on the detected position of the detection mark 1017.

In the second step, an alignment mark 1703 is detected based on the estimated position of the test pattern. Since the alignment mark 1703 is printed near each pattern for pattern matching, the position of the corresponding pattern for pattern matching is estimated based on the detected position of the alignment mark 1703.

In the third step, pattern position detection is performed using pattern matching based on the estimated position of the pattern for pattern matching.

The processing of detecting the detection mark 1017 in the first step will be described.

This processing uses, from data of three R, G, and B color components forming the read image, the brightness value of a color component whose density is highest in the printing color of the printhead of the detection target pattern. For example, the R component is used for C (cyan), the G component is used for M (magenta), and the B component is used for Y (yellow). Note that one of the color components is designated and used for a printing color, such as K (black), whose density is high for all the color components.

In FIG. 22, an area 1705 represents a portion obtained by partially enlarging the detection mark 1017. The detection mark 1017 is detected based on the average density of a predetermined area of the read image. A detection mark detection area 1706 is an area where the average density is acquired. If the average density is equal to or higher than a predetermined density, the area 1706 is judged as a region of a detection mark, and the central position of the detection mark detection area 1706 is set as a detection mark detection position 1707. The settings of the area and the predetermined density may be changed.

Subsequently, the upper left end position and the upper right end position of the detection mark 1017 are detected. An area 1708 represents a portion obtained by enlarging the upper left end portion of the detection mark 1017, and an area 1710 represents a portion obtained by enlarging the upper right end portion of the detection mark 1017. An area where the density is equal to or higher than the predetermined density is scanned from the detection mark detection position 1707, and an upper left end portion 1709 of the area where the density is equal to or higher than the predetermined density is set as the upper left end position of the detection mark. Similarly, the upper right end portion 1711 of the area where the density is equal to or higher than the predetermined density is set as the upper right end position of the detection mark. An alignment mark detection range is estimated by calculating the barycenter of a predetermined area from the position determined based on the upper left end position 1709 of the detection mark.

As described above, it is possible to estimate a detection range of the alignment mark 1703 or the like by detecting the detection mark 1017 of the pattern 1016 shown in FIG. 14.

Similar to the detection processing of the detection mark 1017, the detection processing of the alignment mark 1703 detects the position of the alignment mark by scanning an area where the density is equal to or higher than the predetermined density, and calculating the barycenter of the density area.

Subsequently, the position of the pattern for pattern matching is estimated. An area 1704 is an area indicating the upper left position of the pattern for pattern matching. Furthermore, the detection result of the detection mark is used to judge a specific chip of a specific printhead corresponding to the pattern. The final position of the pattern for pattern matching on the image is detected by roughly determining the position by the above processing and then performing position detection processing including pattern matching processing.

The position of the pattern for pattern matching on the image is a position at which a distance used to calculate various shift amounts (a manufacturing error between the nozzle arrays, a manufacturing error between the chips, the slant of the printhead, and the position shift between the printheads) in head position shift correction is calculated.

Figure 23:
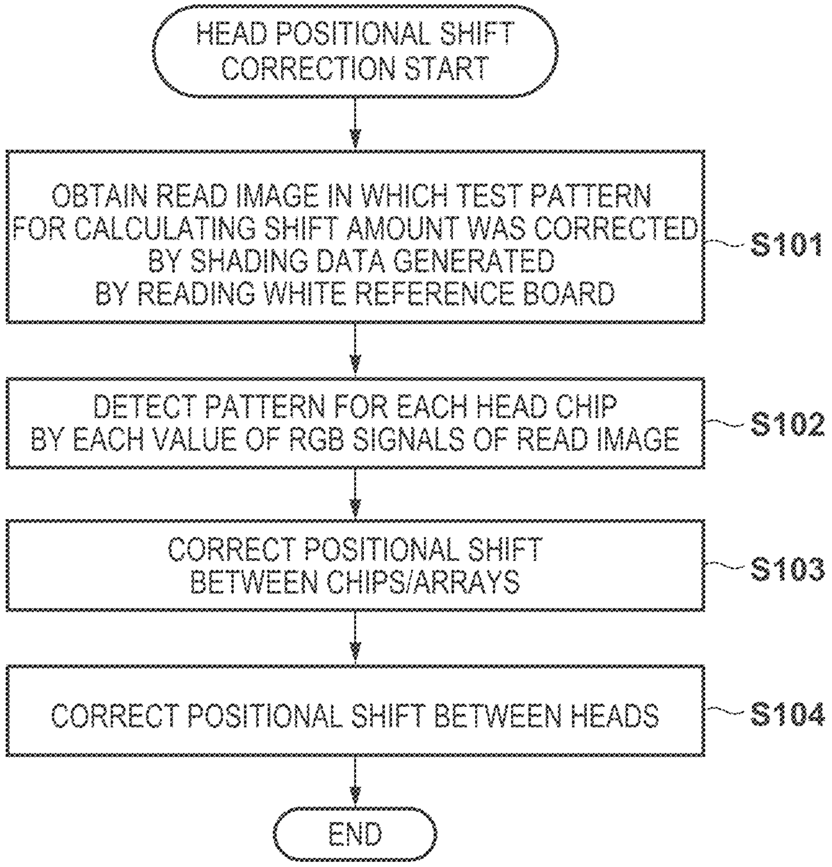
FIG. 23 is a flowchart illustrating head position shift correction processing executed using a test pattern for head position shift correction printed on the print medium.

FIG. 23 is a flowchart illustrating the procedure of reading and analysis of the head position shift, that is, a flowchart illustrating head position shift correction processing performed using the test pattern for head position shift correction printed on the print medium.

In step S101, the inspection unit 9B reads the test pattern 1002 for head position shift correction calculation printed on the print medium P. At this time, the inspection unit 9B reads the test pattern 1002 by performing shading correction using shading data generated by reading a white reference board.

A timing of starting reading of the test pattern 1002 by the inspection unit 9B may be set to time after a predetermined time elapses since the start of printing of the test pattern or time after conveying the print medium P by a predetermined amount since the end of printing of the test pattern. On the other hand, a reading end timing is set to time after the end of reading of a predetermined number of sub-scanning lines since the start of reading.

In step S102, an inspection control unit 15E detects the pattern corresponding to each head chip 10 from the read image of the test pattern 1002 read in step S101. The processing of detecting the pattern corresponding to each head chip 10 is as described in detail with reference to FIG. 21.

The detection mark corresponding to each head chip 10 of each printhead 30 is detected with a signal value of each of R, G, and B color component data representing the read image, and the patterns 1022 and 1023 for pattern matching are finally detected. Furthermore, the pattern corresponding to each head chip 10 is classified as the pattern 1016, 1019, or 1223 corresponding to each head chip 10 of each printhead 30 or the pattern 1301 for the position shift of the printhead.

In step S103, the inspection control unit 15E performs calculation of shift correction between the nozzle arrays of each head chip 10 of each printhead 30 using the pattern corresponding to each head chip 10 of each printhead 30 detected in step S102. Furthermore, calculation of inter-chip shift correction of each head chip 10 of each printhead 30 and calculation of slant correction of each printhead 30 are executed.

In step S104, the inspection control unit 15E executes calculation of position shift correction of each printhead 30 using the pattern 1301 for the position shift of the printhead 30 detected in step S102.

Therefore, according to the above-described embodiment, it is possible to implement high-quality printing by appropriately correcting the slant of each printhead and the printing shift caused by time-divisionally driving the heaters of each head chip.

Second Embodiment

The first embodiment has explained the example of correcting, with respect to the reference head, the slants of the remaining heads. This embodiment will explain an example of correcting the slant of a reference head with respect to a transfer member 2. Note that a description of the same apparatus arrangement and the like as in the first embodiment will be omitted.

Figure 24:
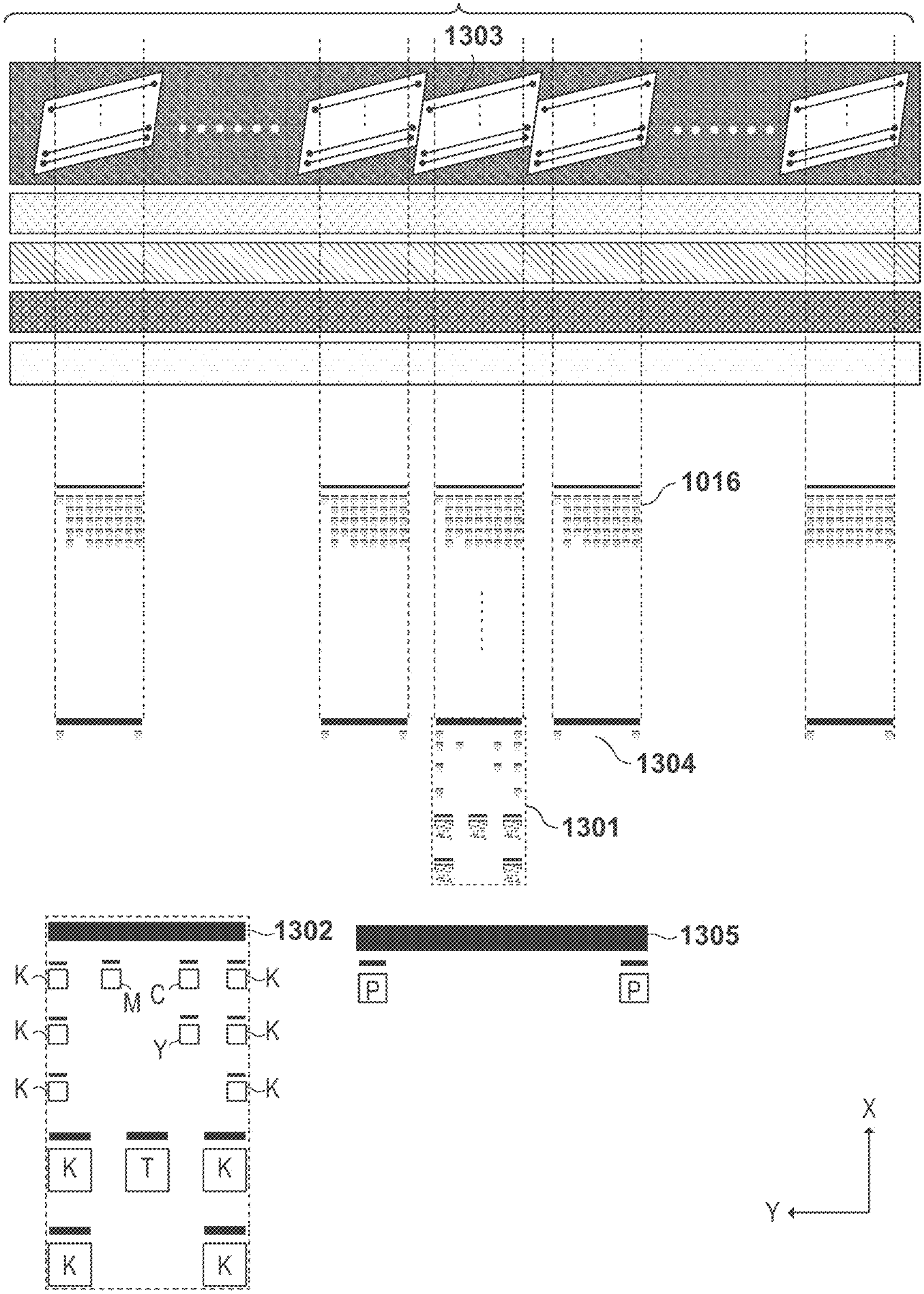
FIG. 24 is a view schematically showing the correspondence between the test patterns and the printheads.

FIG. 24 is a view showing the correspondence among print chips, printheads, and test patterns used for performing inter-color shift correction calculation between the printheads and correction calculation of the slant of printhead K with respect to the transfer member 2. In FIG. 24, patterns 1301, 1302, and 1303 are the same as those described with reference to FIG. 17 in the first embodiment. In this embodiment, test patterns 1016 and 1304 for calculating the slant of printhead K with respect to the transfer member 2 are used. The pattern 1304 is printed by the printhead of a printing color corresponding to a pattern 1305. The pattern 1305 is printed by array 0 of ink color K which is the same array as that for the pattern 1204 of the pattern 1016.

Figure 25:
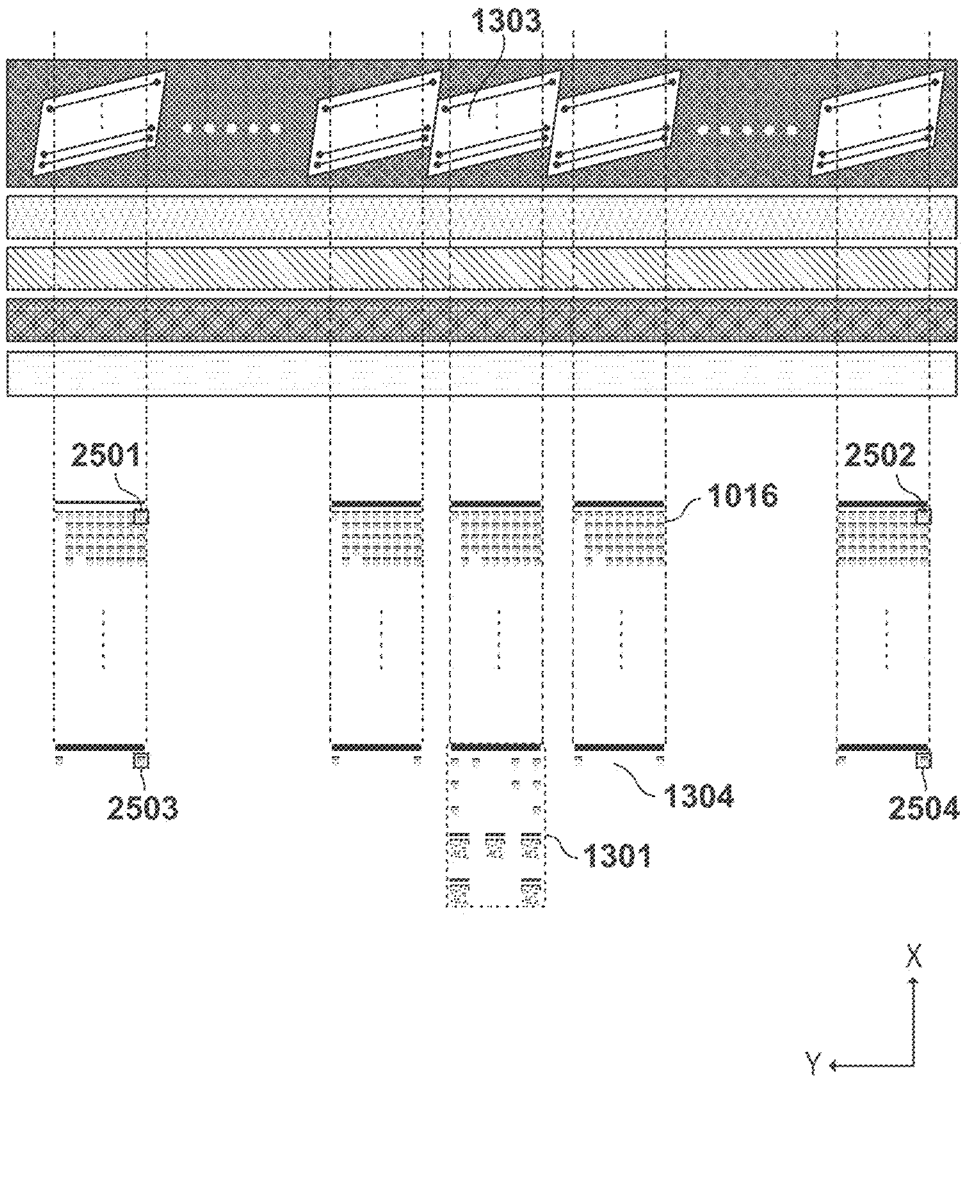
FIG. 25 is a view schematically showing patterns for calculating the slant amount of a reference head with respect to a transfer member.

FIG. 25 is a view showing patterns for calculating a slant amount θ_K of reference head K with respect to the transfer member 2. All patterns 1022 for pattern matching of the pattern 1016 are the same and arranged at the same X coordinate. Patterns 2501 and 2502 that are farthest away from each other in the Y direction are detected. The patterns 1304 are also arranged at the same X coordinate, and patterns 2503 and 2504 that are farthest away from each other in the Y direction are detected. The patterns 2501 and 2503 and the patterns 2502 and 2504 are arranged on the same Y coordinates, respectively. To reduce a calculation error, the patterns 2501 and 2502 and the patterns 2503 and 2504 are as far as possible from each other in the Y direction. That is, the patterns 2501 and 2502 are selected from the two patterns 1022 for pattern matching, which are farthest away from each other, of the patterns 1016 at the same X coordinate. The same applies to the patterns 2503 and 2504. The patterns 2501 and 2503 and the patterns 2502 and 2504 are desirably as far as possible in the X direction. That is, the patterns 2501 and 2503 are selected from the patterns 1022 for pattern matching, which are farthest away from each other, among two patterns 1022 for pattern matching on the same Y coordinate. The same applies to the patterns 2502 and 2504.

Figure 26:
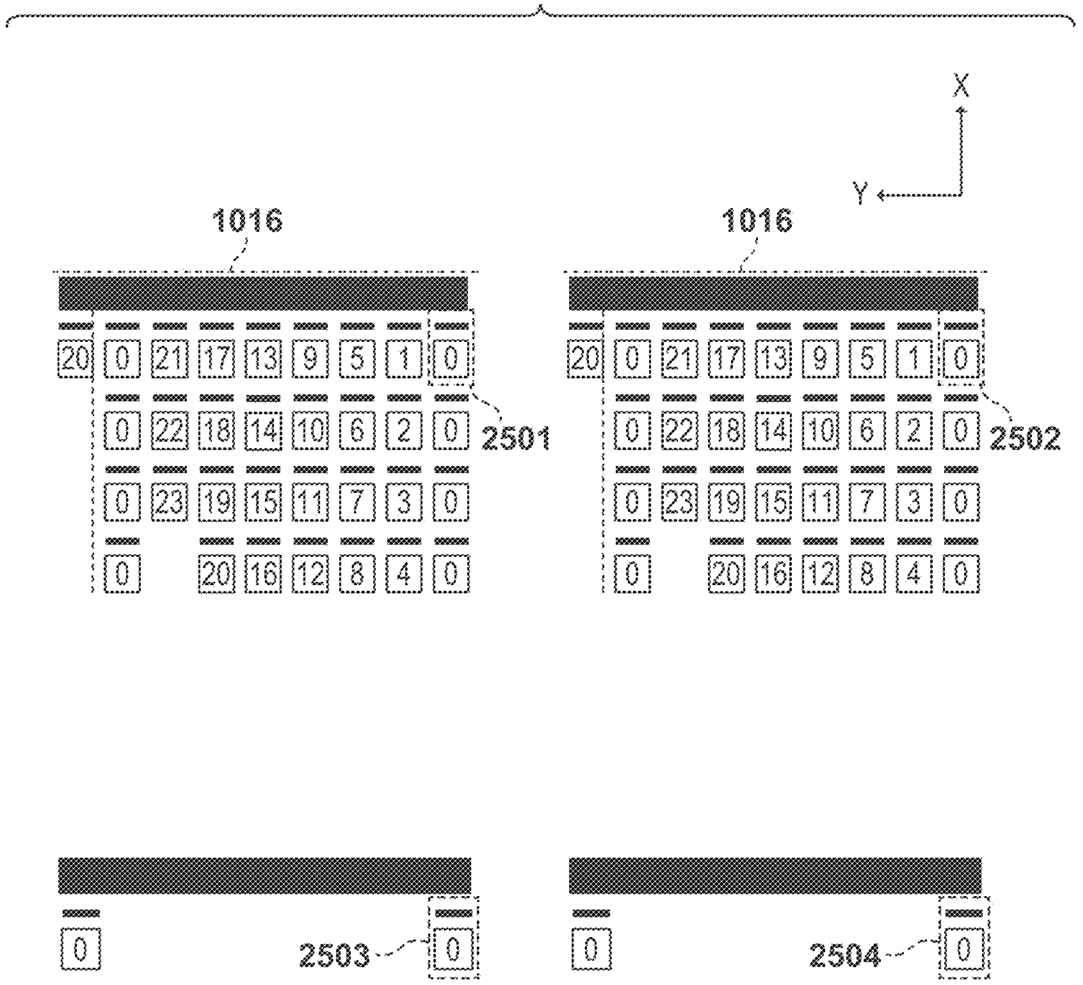
FIG. 26 is a view schematically showing the patterns for calculating the slant amount of the reference head with respect to the transfer member.

Then, the barycentric coordinates of the patterns 2501, 2502, 2503, and 2504 are acquired. FIG. 26 is a view showing a state in which the patterns 2501, 2502, 2503, and 2504 are printed by array 0 of ink color K.

Figure 27A:
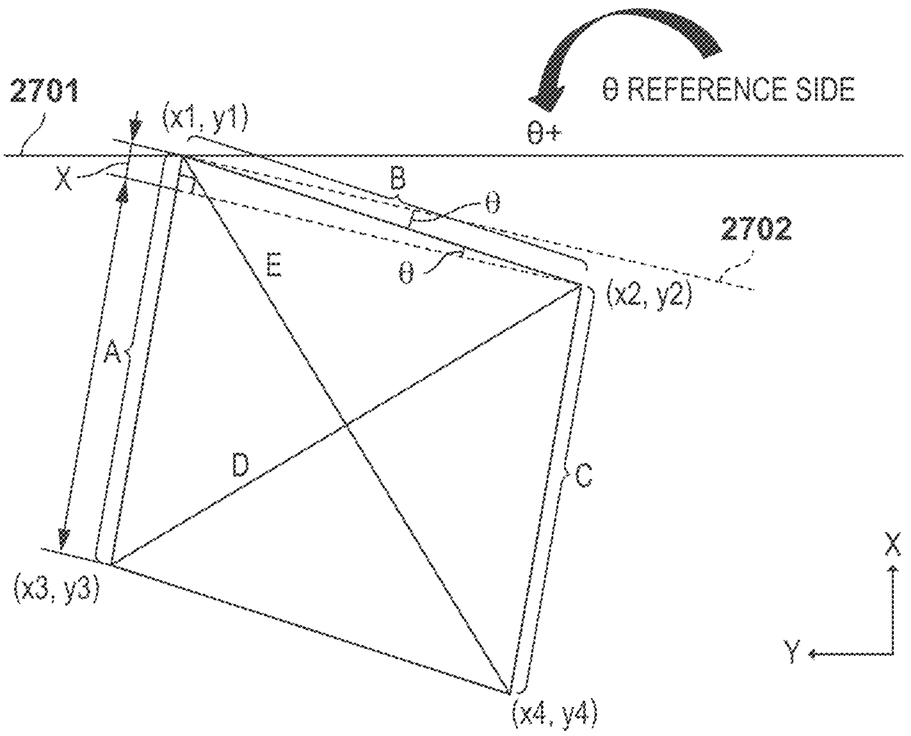
FIGS. 27A and 27B are views for explaining a method of calculating the slant amount of the reference head with respect to the transfer member.
Figure 27B:
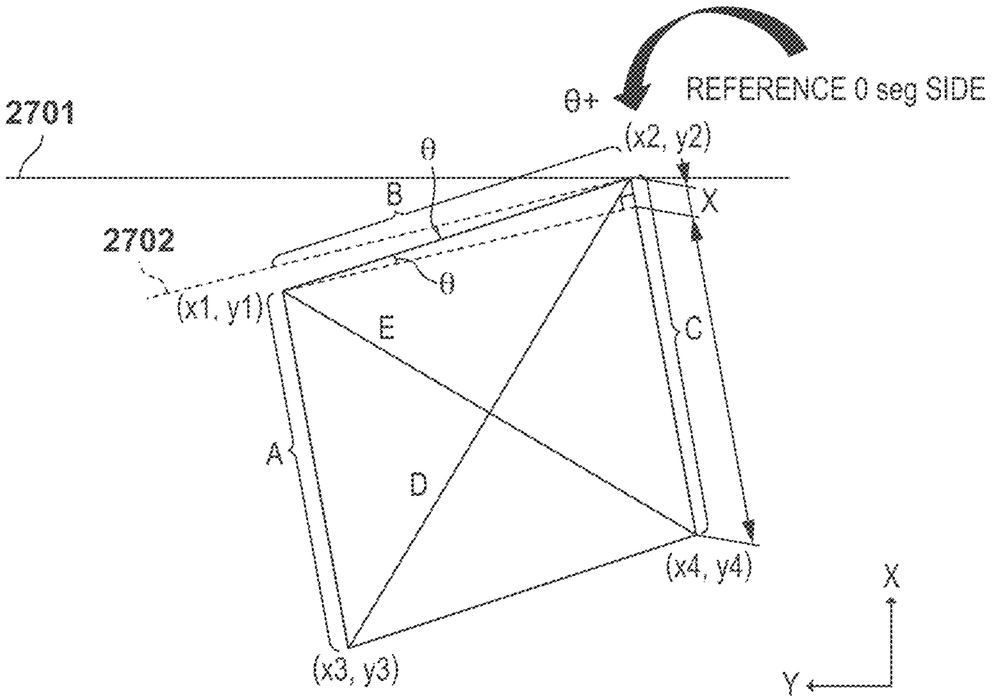

FIGS. 27A and 27B are views for explaining a method of calculating the slant amount of reference head K with respect to the transfer member 2. The barycentric coordinates of the patterns 2501, 2502, 2503, and 2504 are represented by (x1, y1), (x2, y2), (x3, y3), and (x4, y4), respectively. In FIGS. 27A and 27B, reference numeral 2701 denotes a reference line of a CCD line scanner; and 2702, a reference line of the transfer member.

A figure formed by connecting the coordinates of the above four points is a parallelogram when 0_K represents a slant. That is, $$A=\sqrt{\{(x1-x3)^2+(y1-y3)^2\}}$$

$$B=\sqrt{\{(x1-x2)^2+(y1-y2)^2\}}$$

$$C=\sqrt{\{(x2-x4)^2+(y2-y4)^2\}}$$

$$D=\sqrt{\{(x2-x3)^2+(y2-y3)^2\}}$$

$$E=\sqrt{\{(x1-x4)^2+(y1-y4)^2\}}$$

Formulas are different in accordance with whether θ_K is positive or negative. θ_K is positive for D>E, is negative for D<E, and is 0 for D=E.

Case in which θ_K<0

As shown in FIG. 27A, let X be a distance between (x1, y1) and an intersection point with a normal drawn from (x2, y2) to A. Then, $$B^2-X^2=D^2-(A-x)^2$$

$$X=(A^2+B^2-D^2)/2*A$$

$$\sin \theta\_K=X/B$$

$$\theta\_K(\text{rad})=\arcsin(\theta\_K)*-1$$

Case in which θ_K>0

As shown in FIG. 27B, let X be a distance between (x2, y2) and an intersection point with a normal drawn from (x1, y1) to C. Then, $$B^2-X^2=E^2-(C-X)^2$$

$$X=(B^2+C^2-E^2)/2*A$$

$$\sin \theta\_K=X/B$$

$$\theta\_K(\text{rad})=\arcsin(\theta\_K)$$

The slant is corrected by moving the actuator 33 in accordance with the above obtained slant amount of reference head K with respect to the transfer member 2. Correction of the shift in the X direction between the chips is performed by changing a discharge timing in accordance with the above obtained shift amount between the chips.

The above embodiment has explained the example of calculating the value of θ_K by acquiring the coordinates of the four points of the patterns 2501, 2502, 2503, and 2504. However, if the direction of the slant is known, the value of θ_K may be calculated based on the coordinates of three points.

Furthermore, the example of obtaining the slant of the reference head with respect to the transfer member 2 has been explained. However, the slants of the remaining heads with respect to the transfer member 2 may be calculated.

Other Embodiment

In the above embodiments, the print unit 3 includes the plurality of printheads 30. However, a print unit 3 may include one printhead 30. The printhead 30 may not be a full-line head but may be of a serial type that forms an ink image while scanning the printhead 30 in a Y direction.

A conveyance mechanism of the print medium P may adopt another method such as a method of clipping and conveying the print medium P by the pair of rollers. In the method of conveying the print medium P by the pair of rollers or the like, a roll sheet may be used as the print medium P, and a printed product P' may be formed by cutting the roll sheet after transfer.

In the above embodiments, the transfer member 2 is provided on the outer peripheral surface of the transfer drum 41. However, another method such as a method of forming a transfer member 2 into an endless swath and running it cyclically may be used.

Furthermore, the printing system according to the above embodiments adopts the method of forming an image on the transfer member and transferring the image to the print medium. The present invention, however, is not limited to this. For example, the present invention is also applicable to a printing apparatus that adopts a method of forming an image by discharging ink from the printhead to the print medium directly. In this case, the printhead used may be a full-line head or a serial type printhead that reciprocally moves.

In the second embodiment, the slant of the reference head with respect to the transfer member 2 is obtained. The present invention, however, is not limited to this. A slant with respect to an endless belt or a print medium such as a paper surface may be obtained.

Although the image printed on the print medium P is read, the present invention is not limited to this. An image printed on the transfer member 2 or the endless belt may be read.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-148713, filed Aug. 7, 2018, and 2019-076490, filed Apr. 12, 2019, which are hereby incorporated by reference herein in their entirety.

What is claimed is:

1. A printing apparatus comprising:

at least one printhead including a plurality of chips each including a plurality of nozzle arrays which are arranged in a predetermined nozzle array direction and each of which is formed from a plurality of nozzles and energy generation elements provided in correspondence with the nozzles of each nozzle array and each configured to generate energy to be used to discharge ink;

a driving unit configured to sequentially drive print elements corresponding to nozzles of each of a plurality of groups into which the plurality of nozzles of each nozzle array included in the printhead are divided by setting nozzles successive in the nozzle array direction as one group;

a reading unit configured to read a predetermined test pattern printed on the print medium by driving the printhead;

an analysis unit configured to analyze the test pattern read by the reading unit; and a calculation unit configured to calculate a slant of the printhead with respect to a reference based on a result of the analysis by the analysis unit;

wherein the predetermined test pattern includes at least three tile patterns, coordinates of three points are acquired from the tile patterns based on the result of the analysis by the analysis unit, and the calculation unit calculates a relative slant between the printhead and the print medium based on information of the coordinates.

2. The apparatus according to claim 1, wherein two of the at least three tile patterns are at the same position in an intersecting direction intersecting the nozzle array direction.

3. The apparatus according to claim 2, wherein among the tile patterns at the same position in the intersecting direction, patterns farthest away from each other with respect to the nozzle array direction are used for the analysis by the analysis unit.

4. The apparatus according to claim 1, wherein two of the at least three tile patterns are at the same position in the nozzle array direction.

5. The apparatus according to claim 4, wherein if there are at least two tile patterns at the same position in the nozzle array direction, patterns farthest away from each other in an intersecting direction intersecting the nozzle array direction are used for the analysis by the analysis unit.

6. The apparatus according to claim 1, wherein correction for the relative slant of each of the plurality of chips is not performed.

7. A method of controlling a printing apparatus which includes at least one printhead including a plurality of chips each including a plurality of nozzle arrays which are arranged in a predetermined nozzle array direction and each of which is formed from a plurality of nozzles and energy generation elements provided in correspondence with the nozzles of each nozzle array and each configured to generate energy to be used to discharge ink, and a driving unit configured to sequentially drive print elements corresponding to nozzles of each of a plurality of groups into which the plurality of nozzles of each nozzle array included in the printhead are divided by setting nozzles successive in the nozzle array direction as one group, the method comprising:

reading a predetermined test pattern printed on the print medium by driving the printhead;

analyzing the test pattern read in the reading; and calculating a slant of the printhead with respect to a reference based on a result of the analyzing, wherein the predetermined test pattern includes at least three tile patterns, coordinates of three points are acquired from the tile patterns based on the result of the analyzing, and in the calculating, a relative slant between the printhead and the print medium is calculated based on information of the coordinates.

* * * * *